United States Patent [19]
Ohi

[11] Patent Number: 5,546,186
[45] Date of Patent: Aug. 13, 1996

[54] APPARATUS FOR HOLOGRAPHIC INTERFEROMETRY SUITABLE FOR INSPECTION OF CYLINDRICAL OPTICAL SURFACES

[75] Inventor: Shigenori Ohi, Omiya, Japan

[73] Assignee: Fuji Photo Optical Co., Ltd., Omiya, Japan

[21] Appl. No.: 544,112

[22] Filed: Oct. 17, 1995

Related U.S. Application Data

[63] Continuation of Ser. No. 255,760, Jun. 7, 1994, abandoned.

[30] Foreign Application Priority Data

| Jun. 8, 1991 | [JP] | Japan | 5-163351 |
| Jun. 8, 1993 | [JP] | Japan | 5-163348 |
| Jun. 8, 1993 | [JP] | Japan | 5-163349 |
| Jun. 8, 1993 | [JP] | Japan | 5-163350 |

[51] Int. Cl.⁶ .......................... G01B 9/021; G01B 11/00
[52] U.S. Cl. .......................... 356/348; 356/359; 356/363; 250/237 G
[58] Field of Search .......................... 356/347, 348, 356/359, 354, 355, 360, 363; 250/237 G

[56] References Cited

U.S. PATENT DOCUMENTS

| 4,606,640 | 8/1986 | Hirst | 356/360 |
| 4,770,531 | 9/1988 | Tanaka et al. | 356/363 |
| 4,783,055 | 11/1988 | Widen et al. | 356/348 |
| 5,062,712 | 11/1991 | Sakuta et al. | 356/358 |
| 5,179,863 | 1/1993 | Uchida et al. | 356/363 |
| 5,363,196 | 11/1994 | Cameron | 356/363 |

Primary Examiner—Frank Gonzalez
Assistant Examiner—Jason D. Eisenberg
Attorney, Agent, or Firm—Oblon, Spivak, McClelland, Maier & Neustadt, P.C.

[57] ABSTRACT

A holographic interferometry apparatus for inspecting cylindrical optical surfaces. Laser light is split into regular reflection light and diffraction light by a holographic optical element. A reference reflector plate receives the regular reflection light. An object with a cylindrical optical surface receives the diffraction light. The object is held on a specimen holder table which has a four-axis adjustment mechanism which allows adjustments in the X,Y,Z and θ directions. Interference fringes are formed by the interference of light reflected from the object and from the reflector plate.

11 Claims, 19 Drawing Sheets

1

APPARATUS FOR HOLOGRAPHIC INTERFEROMETRY SUITABLE FOR INSPECTION OF CYLINDRICAL OPTICAL SURFACES

This application is a continuation of application Ser. No. 08/255,760, filed on Jun. 7, 1994, now abandoned.

BACKGROUND OF THE INVENTION

1. Field of the Art

This invention relates to an apparatus for holographic interferometry particularly suitable for use in measuring surface configurations of cylindrical optical surfaces of such as cylindrical lenses and cylindrical mirrors or of a product with a similarly cylindrical surface to be inspected (hereinafter referred to simply as "cylindrical specimen" or "specimen lens" for brevity).

2. Prior Art

Interferometers are widely resorted to, for example, for non-contacting precision measurement of surface configurations of optical elements. Typical of the interferometers usually employed for inspection of specimens of the above-mentioned nature is the so-called Fizeau's interferometer, which employs laser light as a light source and which is arranged to reflect part of the light rays from the laser light source on a surface of a reference lens, while reflecting on a surface of a specimen lens part of light rays transmitted through the reference lens and measuring the resulting interference fringes of the two light reflections. More specifically, a laser beam from the laser light source is reflected on (or passed through) a beam splitter and then collimated into parallel light rays through a collimator lens, projecting the parallel light rays toward the specimen lens through the reference lens, transmitting through (or reflecting on) the beam splitter the two light reflections from the light incident surfaces of the reference lens and the specimen lens, and focusing an image of interference fringes, which is produced by interference between the two light reflections, at a predetermined position through an interference fringe imaging lens for observation purposes. In case the specimen lens is a spherical lens, an accurate measurement is infeasible unless the center of curvature of the surface of the specimen lens under inspection is held exactly in alignment with the center of curvature of the reference surface of the reference lens.

Recently, with the advent of technology for computerized fabrication of holographic patterns, there has been a trend toward using a holographic interferometer in the measurement of surface conditions of various specimens to be inspected. The holograms obtained by computerized fabrication processes are usually in the form of an optical element which is formed by coating a photoresist film on a substrate of glass, exposing the photoresist film to a holographic pattern, e.g., a grating pattern equivalent to the interference fringes of object and reference waves, by scanning the photoresist film with an electron beam, and developing the holographic pattern to manifest the interference fringes. This holographic optical element is designed to be able to reproduce the object wave upon casting on the interference fringes a reproduced wave equivalent to the reference wave. The holographic interferometry, which is useful for inspection or measurement of special surface configurations, is expected to have a wide range of applications in the future.

A large number of cylindrical lenses or other cylindrical optical elements are used on copier machines, facsimile machines or other apparatus which incorporate an optical scanning system. The surface conditions of a finished cylindrical surface on such a cylindrical optical element can be measured or inspected by means of a holographic interferometry device using a holographic optical element with a grating pattern containing rectilinear stripes or lines in parallel relation with the generator of the cylindrical surface under inspection. Even in case of inspection of a cylindrical optical element, correct measurement is possible only when it is located in correct direction and position relative to the holographic optical element. Unlike spherical lenses, the surface of a cylindrical optical element which has an arcuate surface configuration in a direction perpendicular to the direction of the generator possesses a uniform shape in the direction of the generator, necessitating to provide an extremely complicate positioning mechanism therefor. In addition, the positioning accuracy has to be controlled to an extremely fine level in order to ensure accurate measurement. However, there has not been developed any interferometric apparatus with a precision positioning mechanism for positioning a cylindrical specimen in a predetermined position on a specimen holder table with strictly accurate directional orientation. Naturally, in step with the increasing applications of cylindrical optical elements, there has been a growing demand for an interferometric apparatus which is capable of measuring the surface conditions of such cylindrical optical elements with a high degree of accuracy.

SUMMARY OF THE INVENTION

Under the circumstances as explained above, it is an object of the present invention to realize accurate measurements of surface configurations of cylindrical optical elements by means of holographic interferometry.

It is another object of the present invention to position a cylindrical optical element with extremely high accuracy relative to a holographic interferometer.

It is still another object of the present invention to provide an apparatus for holographic interferometry, with a specimen positioning mechanism which is simple and compact in construction and yet capable of positioning a cylindrical optical element strictly in a correct position to guarantee extremely high accuracy in the measurement of surface configuration of a cylindrical optical element under inspection.

In accordance with the present invention, the above-stated objectives are achieved by the provision of an apparatus for holographic interferometry on cylindrical optical elements, which essentially includes: a light projection/observation unit having a light source section arranged to project laser light from a laser light source in the form of parallel light rays, and an interference fringe observation section; an interferometer unit having a holographic optical element for splitting laser light rays from the light source into regular reflection light and diffraction light, and a reference reflector plate located in position for reflecting the regular reflection light from the holographic optical element; and a specimen positioning mechanism having a specimen holder table supported on a multiple axis adjustment mechanism to hold a cylindrical optical element in a correct position for reception of the diffraction light from the holographic optical element; the multiple axis adjustment mechanism including at least a Z-axis adjustment stage having a lift member for lifting the specimen holder table up and down in a vertical direction, an X-axis adjustment stage supported on the lift member of the Z-axis stage and having a linear adjusting means for adjusting the position of the specimen horizontally in a direction perpendicular to the generator of the cylindrical surface, a θ-angle adjustment stage supported on the X-axis adjustment stage and having an angular adjusting means for adjusting the position of the specimen in an angular direction within a horizontal plane, and a tilt angle adjustment stage supported on the θ-angle adjustment stage and having a tilting means for adjusting the tilt angle of the specimen holder table to one side thereof in the direction of the generator of the cylindrical surface of the specimen.

BRIEF DESCRIPTION OF THE DRAWINGS

The above and other objects, features and advantages of the invention will become apparent from the following particular description of the invention, taken in conjunction with the accompanying drawings illustrating by way of example some preferred embodiments of the invention, which, needless to say, should not be construed as limitative of the invention in any way whatsoever, and in which.

DESCRIPTION OF PREFERRED EMBODIMENTS

Figure 1:
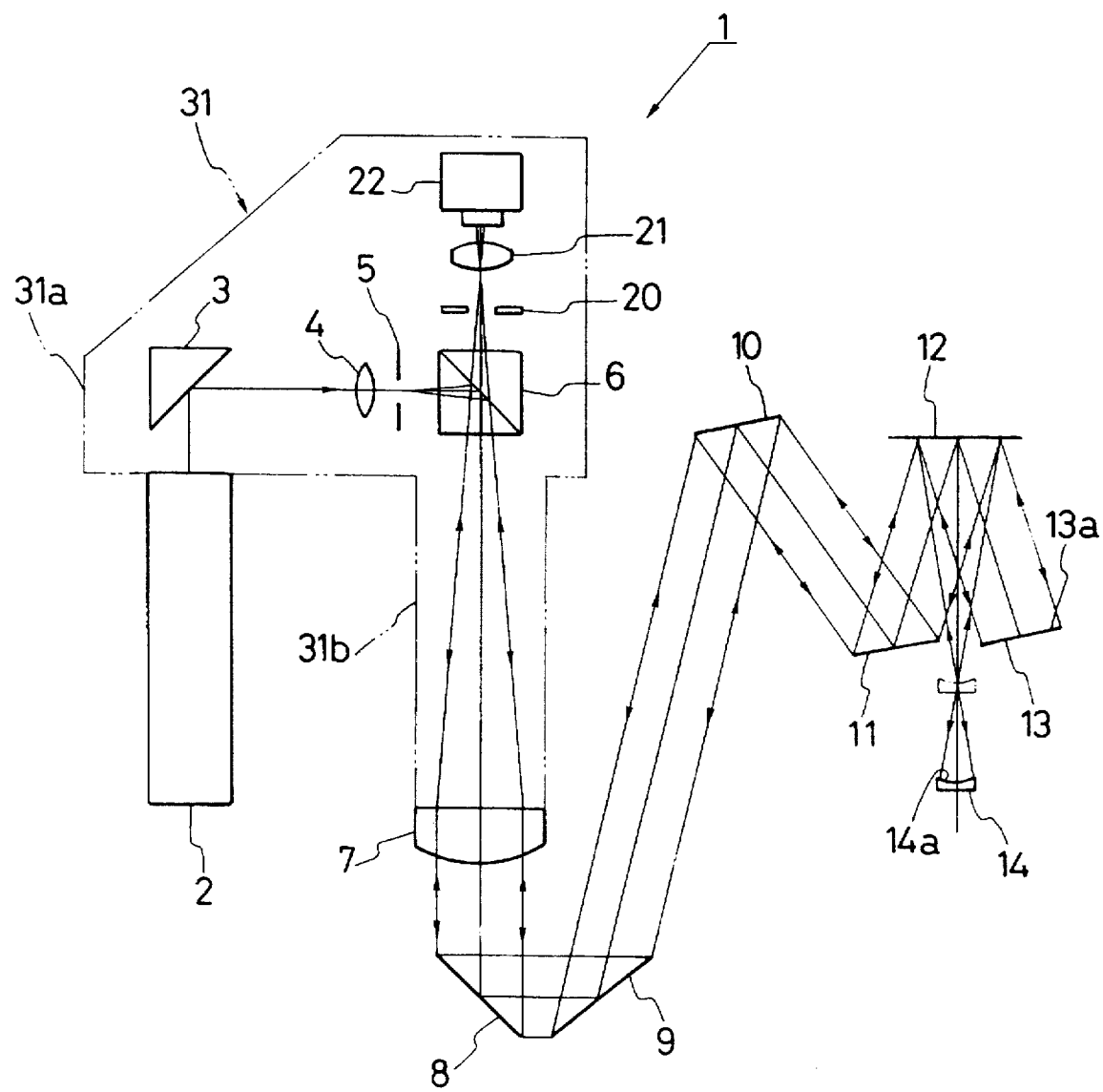
FIG. 1 is a schematic view explanatory of the principles of an apparatus for holographic interferometry according to the invention.

Referring first to FIG. 1 which schematically shows the principles of a holographic interferometry apparatus according to the invention, indicated at 1 is a holographic interferometry apparatus which includes a laser light source 2 using a He-Ne laser or the like, a reflector mirror 3, a divergent lens 4, and a pinhole 5. The laser beam from the laser light source 2 is turned through 90° by the reflector mirror 3 and passed through the divergent lens 4 and then through the pinhole 5 which is located forward of the divergent lens 4. Past the pinhole 5, the light beam with a diverging spot diameter is turned again through 90° by reflection at a beam splitter 6 to direct the light beam in the opposite direction relative to the direction of light projection from the laser light source 2, and collimated into parallel light rays through a collimator lens 7.

The collimated laser light is reflected on a first reflector mirror 8 and then on a second reflector mirror 9, thereby turning the light path upward again. The laser light from the second reflector mirror 9 is further turned by reflection on a third reflector mirror 10 and then on a fourth reflector mirror 11. Located opposingly to the fourth reflector mirror 11 is a holographic optical element 12 which splits the incident laser light from the fourth reflector mirror 11 into regular reflection light and diffraction light. A reference reflector plate 13 is located in the path of the regular reflection light with its reference reflection surface 13a disposed normal to the incident regular reflection light.

On the other hand, a cylindrical lens 14 is placed in the path of the diffraction light. In this instance, for inspection or measurement of the cylindrical lens 14, the holographic optical element 12 bears on its face a holographic pattern consisting of a number of rectilinear parallel stripes or lines extending in the direction of the generator of the cylindrical lens surface 14a under inspection, and positioned in such a way that the diffraction light is converged toward the center axis of the cylindrical lens surface 14a.

The diffraction light from the holographic optical element 12 is once converged at a position on the center axis of the cylindrical surface 14a of the cylindrical lens element 14 (hereinafter referred to simply as "specimen lens" for brevity) under inspection, and then diverged toward and reflected on the cylindrical surface 14a of the lens specimen 14 to return to the holographic optical element 12. The light returning from the specimen lens 14 is reflected on the holographic optical element 12 and directed toward the collimator lens 7 in the form of original parallel light rays. On the other hand, the regular reflection light from the holographic optical element 12 is reflected on the reference reflection surface 13a of the reference reflector plate 13, and the light returning from the reference reflection surface 13a is reflected again on the holographic optical element 12 and also directed toward the collimator lens 7.

Thus, the light reflection of the object wave by the holographic pattern is superposed on the light reflection of the reference wave from the reference reflector plate 13, and as a result interference fringes are formed by mutual interference of these two light reflections. The reflected light rays from the collimator lens 7 are transmitted through the beam splitter 6 to form an image of the interference fringes on an imaging plane of an image pickup means 22, through a stop 20 and an imaging lens 21 which is located in a position at the rear focal point of the collimator lens 7.

Since the holographic optical element 12 has functions of converting planar waves to cylindrical waves corresponding to the cylindrical surface 14a of the specimen lens 14 or vice versa, the resulting interference fringes involve parallel light rays alone, permitting to take a very clear image of interference fringes through the image pickup means 22. It follows that the configuration of the cylindrical surface 14a under inspection can be measured with an extremely high degree of accuracy.

Figure 2:
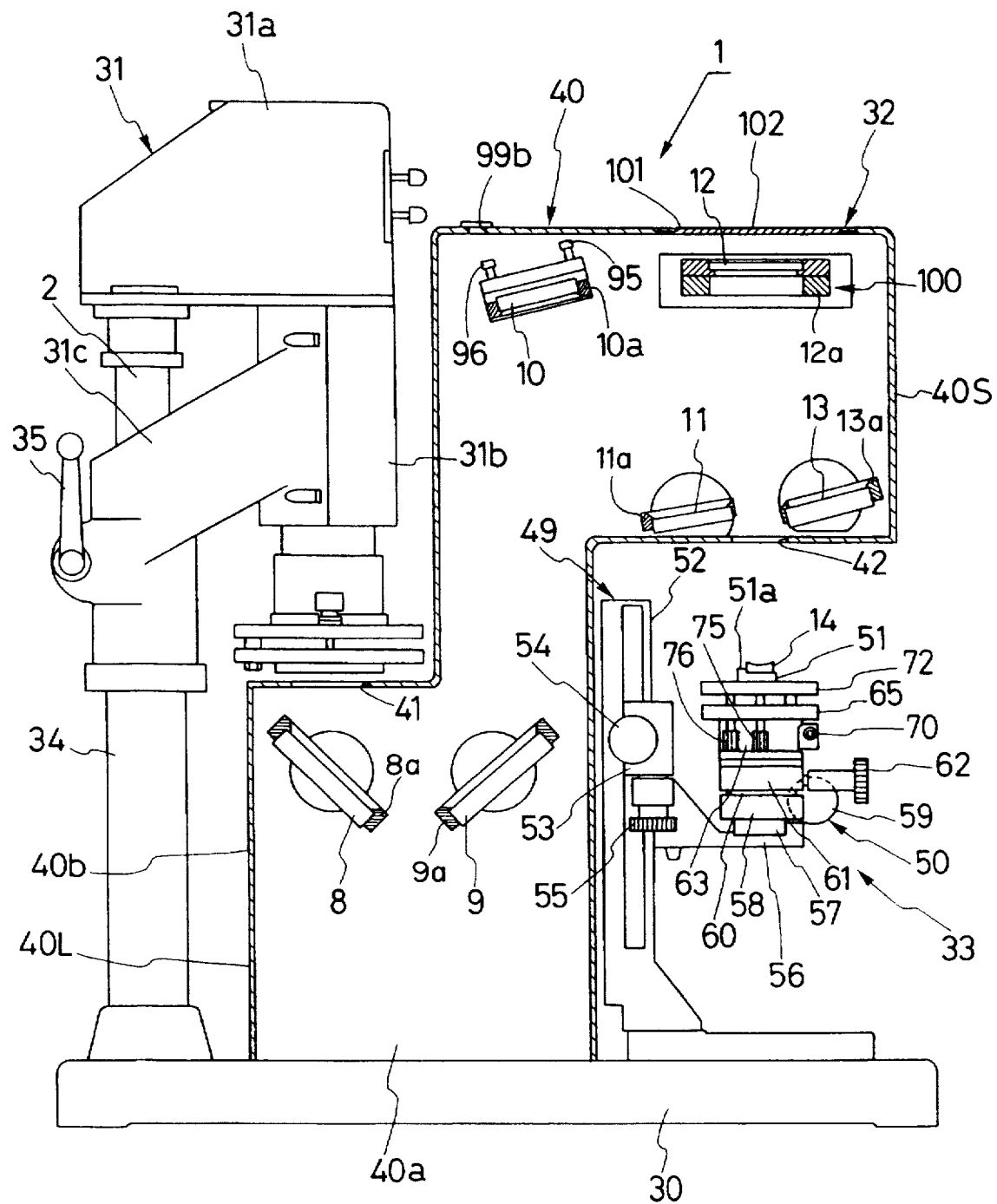
FIG. 2 is a left-hand side view of a holographic interferometry apparatus embodying the present invention, showing its housings in section.
Figure 3:
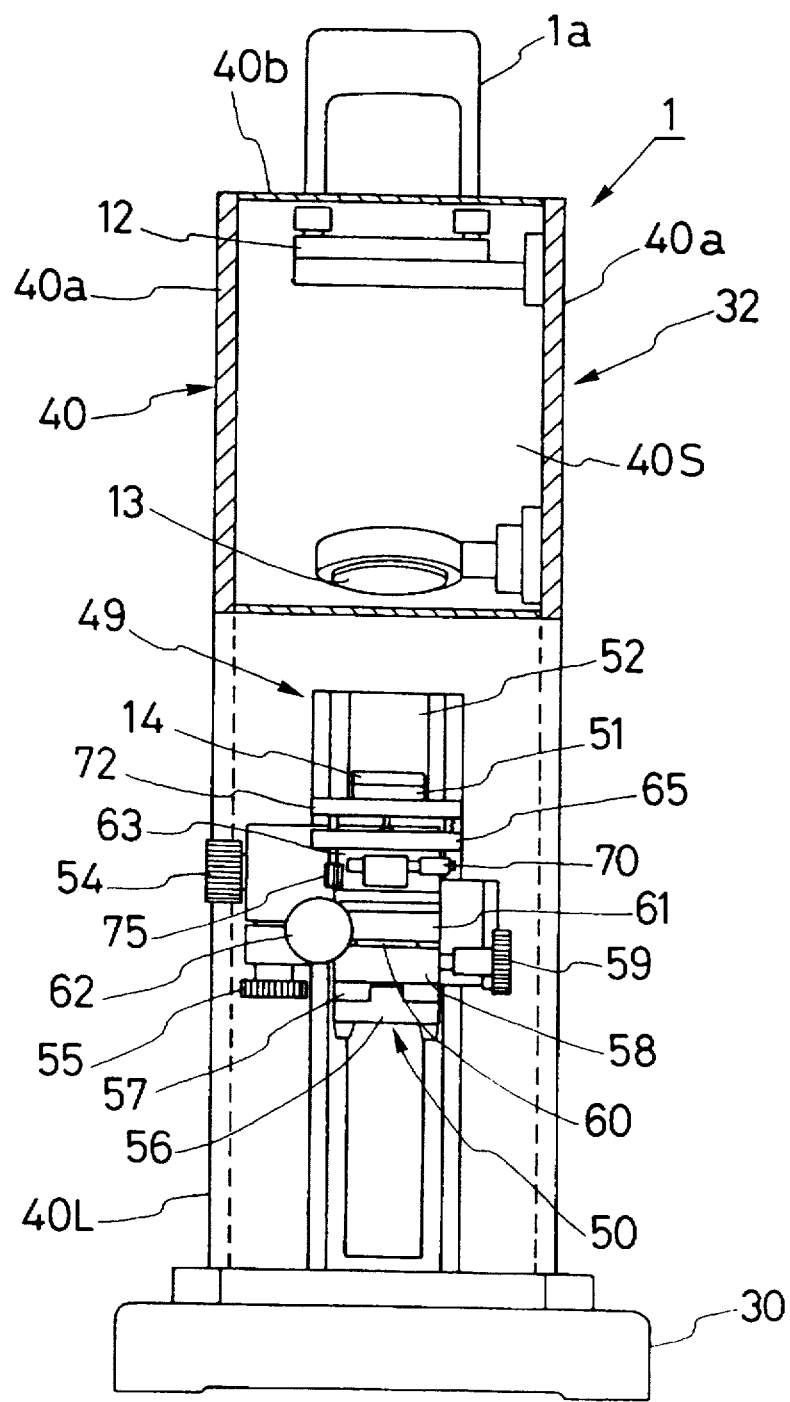
FIG. 3 is a partly sectioned front view of the holographic interferometry apparatus of FIG. 2.
Figure 4:
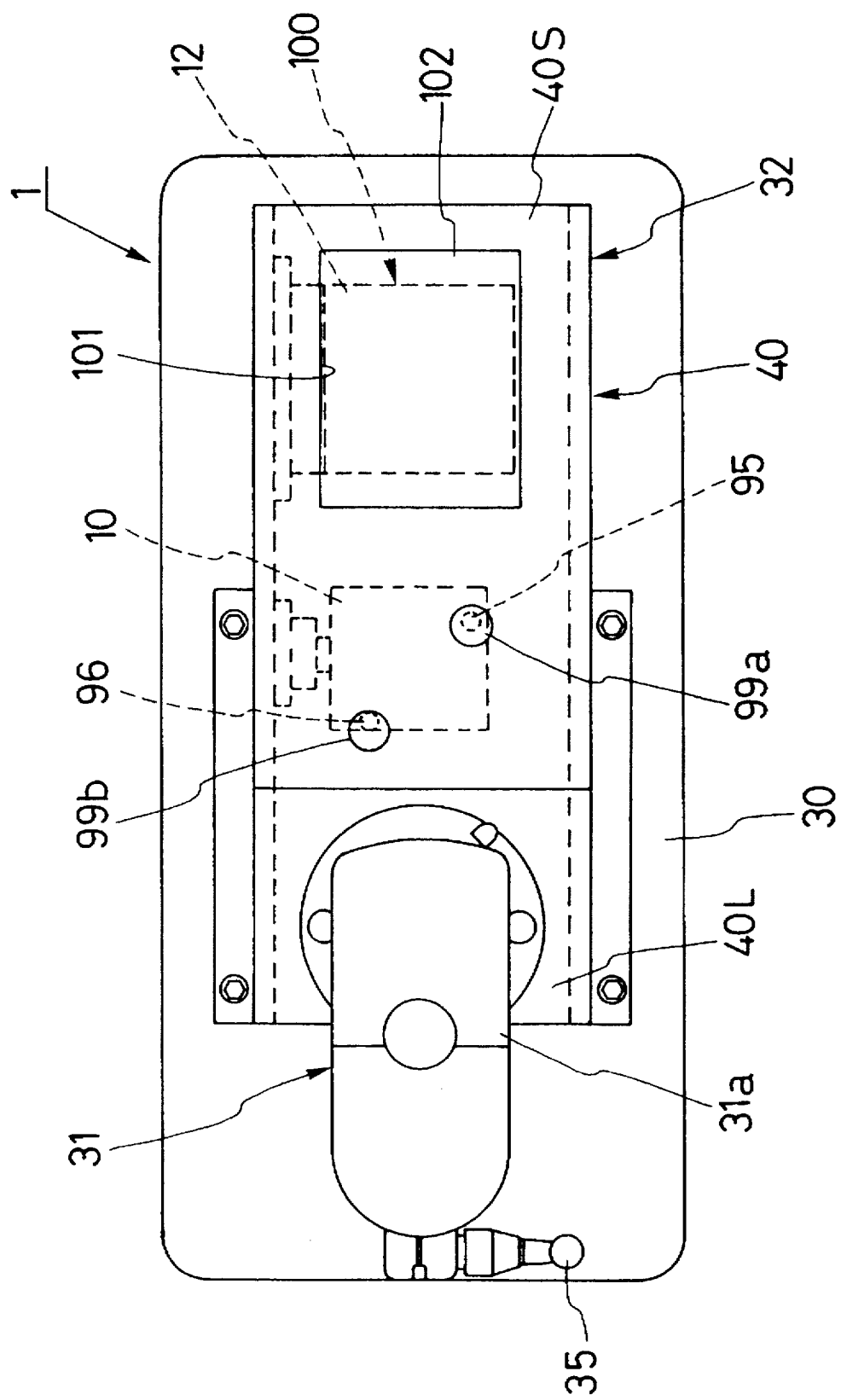
FIG. 4 is a plan view of the apparatus of FIG. 1.

Now, the construction of the holographic interferometry apparatus 1 is described more particularly with reference to FIGS. 2 to 4. In FIG. 2, the reference 30 indicates a machine bed on which a light projection/observation unit 31, an interferometer unit 32 and a specimen positioning mechanism 33 are mounted fixedly. A specimen lens 14 to be inspected is set on the specimen positioning mechanism 33 for measuring its surface configuration in the manner as will be described later. These units and mechanism 31 to 33 are constructed independently of each other and separately installed on the machine bed 30.

The light projection/observation unit 31 includes a main casing 31a and a cylindrical casing 31b. Housed in the main casing 31a is a light path on the side of the light source extending from the reflector mirror 3 to the beam splitter 6 and a light path on the image-forming side extending from the beam splitter 6 to the image pickup means 22. The collimator lens 7 is mounted at the lower end of the cylindrical casing 31b. Contiguously to the cylindrical casing 31b, the light projection/observation unit 31 is provided with a coupling section 31c which is liftably mounted on a post 34 which is erected on the machine bed 30. The post 34 is in the form of a tapped shaft, and the coupling section 31c is movable vertically upward or downward along the post 34 and fixable at a suitable level by means of a locking lever 35.

The interferometer unit 32 is provided with a housing 40 including a pair of side walls 40a and a circumventive wall 40b which is provided between and around the peripheral edges of the side walls 40a in such a manner as to maintain a predetermined spacing between the opposite side walls 40a. The housing 40 is provided with a lower extension room 40L, extending under the light projection/observation unit 31 in the sectional view of FIG. 2, and an upper extension room 40S overhanging the specimen positioning mechanism 33. The lower extension room 40L of the housing 40 is fixedly mounted on the machine bed 30. The bottom side of the upper extension room 40S is extended as far as a position over the specimen positioning mechanism 33. This arrangements contribute to make the housing 40 compact in terms of its inner volume, and to leave the specimen positioning mechanism 33 open on three sides thereof, permitting easy access to the positioning mechanism 33 when setting a specimen lens 14 on or off the positioning mechanism.

The lower extension room 40L of the housing 40 is provided with an aperture 41 in its top circumventive wall in a predetermined position immediately under the light projection/observation unit 31 to guide-the laser beam therethrough. Accordingly, the collimated laser light from the collimator lens 7 of the light protection/observation unit 31 is led into the housing 40 through the aperture 41. Fixedly mounted within the lower extension room 40L of the housing 40 are first and second reflector mirrors 8 and 9 thereby to turn the path of the laser beam which has been introduced into the housing 40. More specifically, the direction of the laser beam which is projected downward from the light projection/observation unit 31 is turned at the first and second reflector mirrors 8 and 9 to switch the light path upward, from the lower extension room 40L toward the upper extension room 40S of the housing 40. Mounted within the upper extension room 40S are third and fourth reflector mirrors 10 and 11 to redirect the laser light toward the holographic optical element 12 which is located in face to face relation with the fourth reflector mirror 11. The laser light which irradiates the holographic optical element 12 is split into regular reflection light and diffraction light by the action of the holographic grating pattern on the optical element 12. The regular reflection light is projected on the reference reflector plate 13 which is located in the path of the regular reflection light from the holographic optical element 12. The diffraction light is projected on the specimen lens 14 on the specimen positioning mechanism 33 through an aperture 42 which is formed in a bottom portion of the upper extension room 40S of the interferometer unit housing 40.

In this instance, the first to fourth reflector mirrors 8 to 11 are mounted on mirror holders 8a to 11a which are fixed on the side wall 40a of the housing 40 by means of screws or other suitable fixation means, respectively. Of these four reflector mirrors 8 to 11, the third reflector mirror 10 is associated with an angular adjustment mechanism as will be described hereinlater. Similarly, the holographic optical element 12 and the reference reflector plate 13 are mounted on a hologram holder 12a and a reference reflector plate holder 13a, respectively, which are likewise fixed on the side wall 40a of the housing 40.

Figure 5:
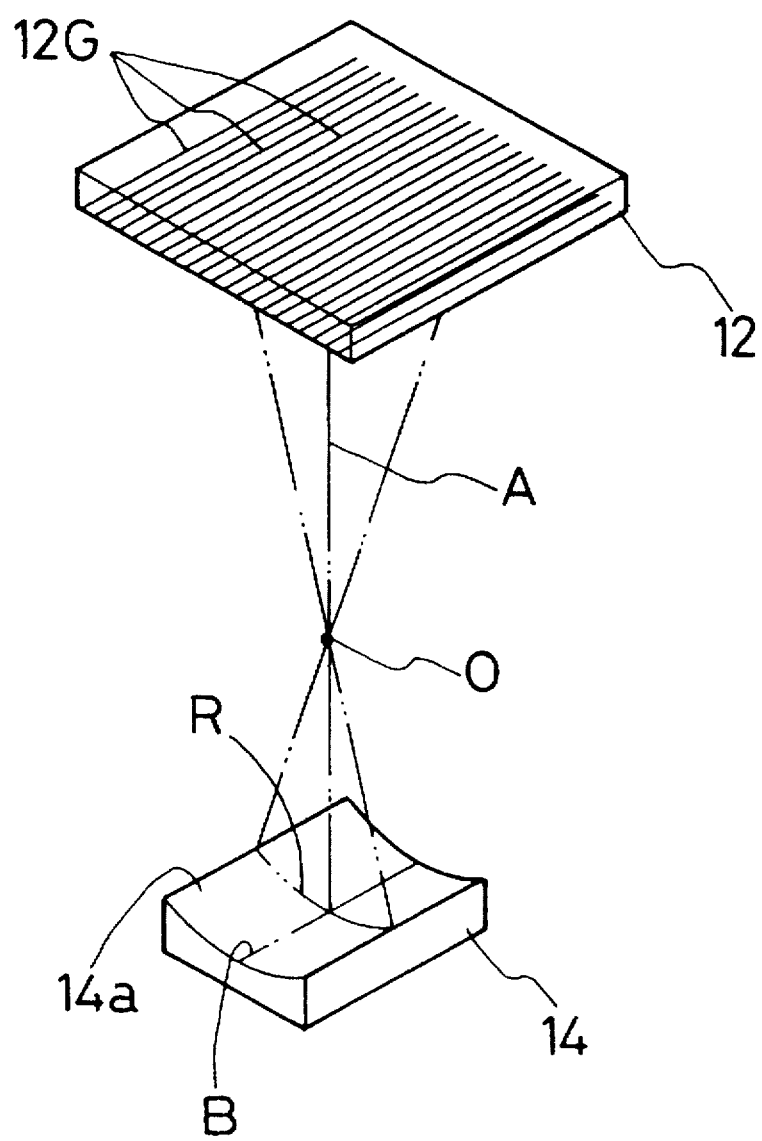
FIG. 5 is a schematic view explanatory of the positional relationship between a specimen lens and a holographic optical element.

The specimen lens 14 is a cylindrical optical element including a cylindrical lens as shown in FIG. 5, a cylindrical mirror or the like, having a cylindrical optical surface 14a to be inspected. The cylindrical surface 14a has a straight surface configuration in the direction of the generator B and a curved surface configuration in the radial direction R which perpendicularly intersects the generator B. For measuring the configuration of this cylindrical surface 14a, the holographic optical element 12 bears a holographic pattern, e.g., rectilinear grating 12G extending parallel in the direction of the generator B. For accurate measurement of the cylindrical surface 14a, the specimen lens 14 has to be positioned in such a way that the generator B is disposed parallel with the holographic grating pattern 12G, that the center O of the curved surface R is located on the optical axis A of the holographic optical element 12 at the convergent point thereof, and that the generator B is disposed normal to the optical axis A of the holographic optical element 12.

For this purpose, the specimen positioning mechanism 33 includes a multiple axis adjustment mechanism 50 and a specimen holder table 51 which is adjustably supported on the multiple axis adjustment mechanism 50 to locate the specimen lens 14 precisely in a correct measuring position. The specimen lens 14 is set in position on the specimen holder table 51, with the generator B of the cylindrical surface 14a in the transverse direction as shown in FIG. 3 and in abutting engagement with positioning projections 51a which are provided on the specimen holder table 51.

Figure 6:
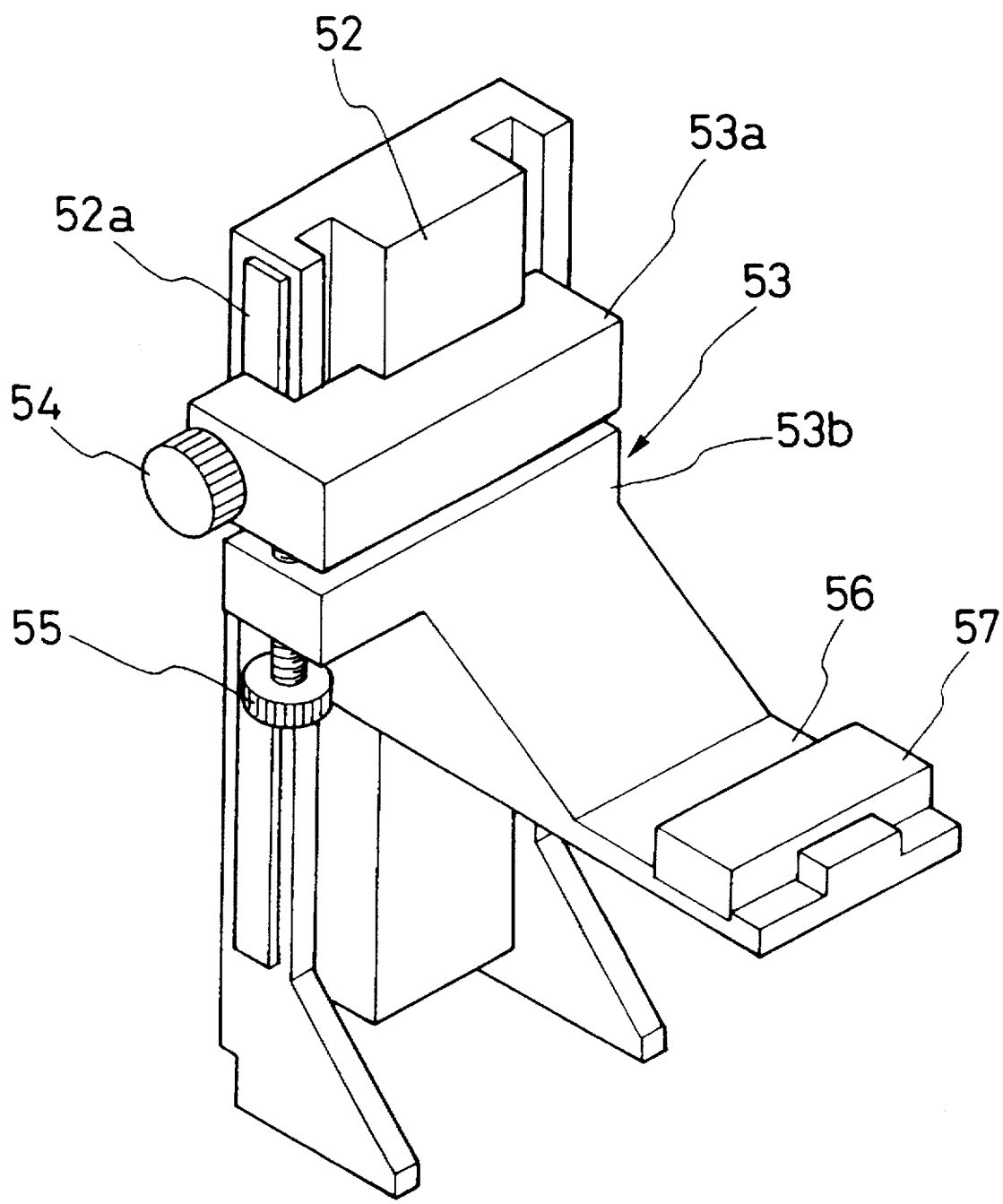
FIG. 6 is a schematic view explanatory of the arrangement of a Z-axis adjustment stage of a multiple axis adjustment mechanism.

The multiple axis adjustment mechanism 50 firstly has a Z-axis adjustment stage. The Z-axis adjustment stage is constituted by a slide guide 52 which is erected vertically on the machine bed 30, and a lift assembly 53 which is vertically slidably mounted on the slide guide 52 as shown in FIG. 6. The lift assembly 53 has a coarse-adjustment slider 53a with a locking screw 54, and a fine-adjustment slider 53b. An adjuster screw 55 (or a micrometer head) for adjustments in the direction of Z-axis is provided between the coarse- and fine-adjustment sliders 53a and 53b. Accordingly, when the locking screw 54 is loosened, the lift assembly 53 can be moved upward or downward to slide the two sliders 53a and 53b upward or downward in an interlocked state. On the other hand, when the locking screw 54 is tightened against a frictional strip 52a on a lateral side of the slide guide 52 to hold the coarse-adjustment slider 53a in fixed state, the fine-adjustment slider 53b can be shifted for fine adjustments (micromotions) in a direction toward or away from the coarse-adjustment slider 53a by turning the adjuster screw 55.

Extended out from the fine-adjustment slider 53b of the lift assembly 53 is a support arm 56 which supports thereon X- and Y-axis adjustment stages for adjustments of the horizontal position in the directions of X- and Y-axes and a θ-angle adjustment stage for adjustment of the angle θ within a horizontal plane. These horizontal adjustment stages are intended for tri-axial adjustments in the direction of X- and Y-axes and of the angle θ. However, depending upon the dimensions of the specimen lens 14, the adjustment in the direction of Y-axis is not necessarily required in all cases. Therefore, the adjustment stages on the support arm 56 should allow at least bi-axial horizontal adjustments in the direction of X-axis and of the angle θ. In this particular embodiment, the support arm 56 is provided with a guide rail 57 in the direction of Y-axis thereby to guide the movements in the direction of Y-axis of a Y-axis table 58 (FIG. 2) which is mounted on the guide rail 57. As is further seen in FIG. 2, the Y-axis table 58 is provided with a Y-axis adjuster screw 59 (or a micrometer head) which can be turned for fine-adjustments of the Y-axis table 58 in the direction of Y-axis, namely, in the direction of the generator B of the specimen lens which is mounted on the specimen holder table 51. Provided on the Y-axis table 58 is an X-axis guide rail 60 which supports thereon an X-axis table 61 in such a way as to permit fine adjustments in the direction of X-axis by turning an X-axis adjuster screw 62.

Figure 7:
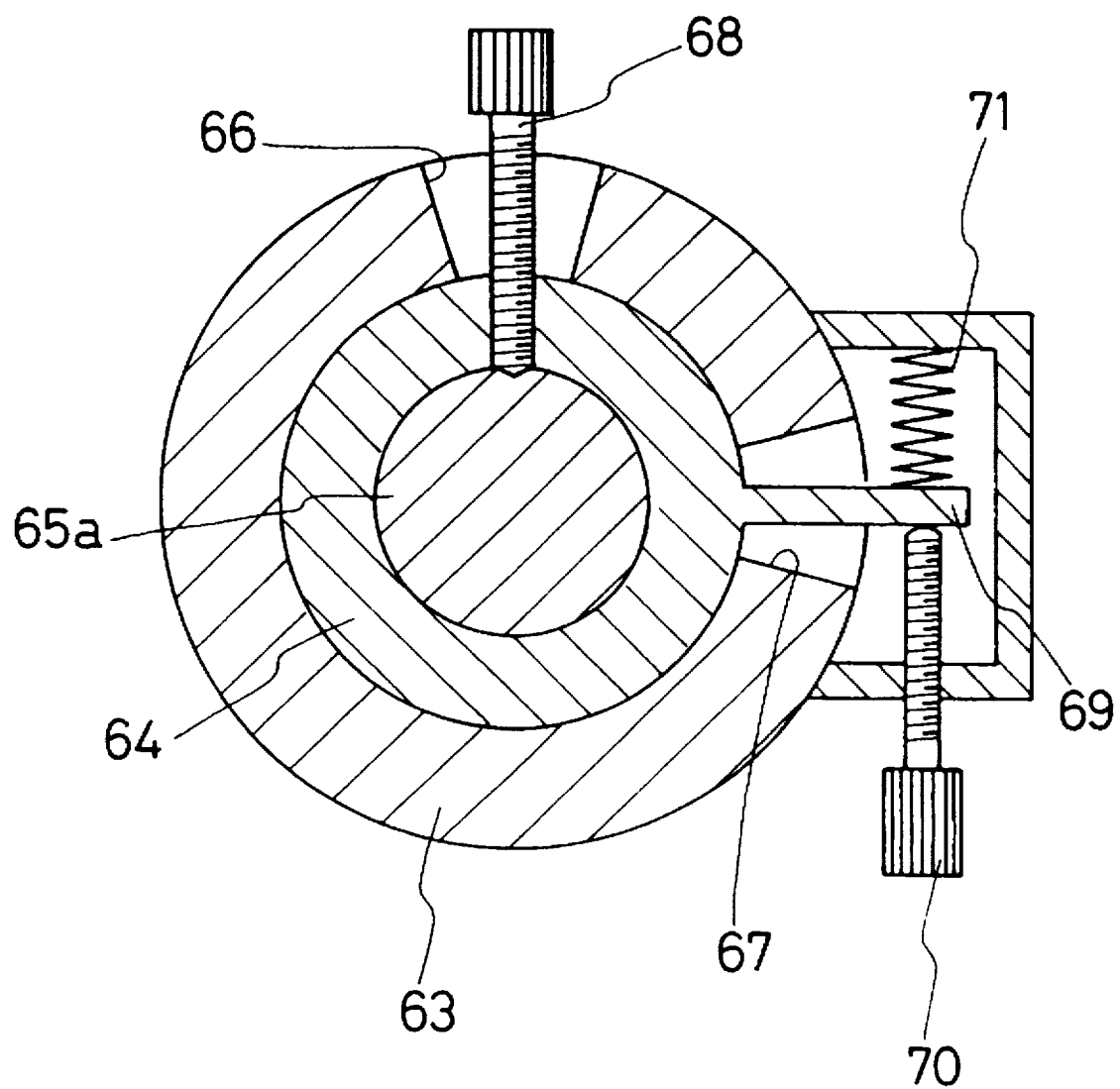
FIG. 7 is a transverse sectional view of a θ-angle adjustment stage the multiple axis adjustment mechanism.

The afore-mentioned θ-angle adjustment stage is provided on the X-axis table 61. More particularly, as clear from FIG. 7, the θ-angle adjustment stage includes an annular upright shaft 63 which is fixed on the X-axis table 61, and a micromotion rotational ring 64 is fitted in the annular fixed shaft 63. Fitted in this micromotion rotational ring 64 is a rotational shaft 65a which is connected to a turn table 65 (FIG. 2). The fixed shaft 63 is bored with slots 66 and 67 at two circumferentially separate positions, receiving in the slot 66 a locking screw 68 which is threaded through the intermediate rotational ring 64 and held in frictional engagement with the rotational shaft 65a at the fore tip end thereof. Therefore, when the locking screw 68 is disengaged from the rotational shaft 65a to put the latter in a freely rotatable state, the turn table 65 can be turned for a coarse adjustment of the angle θ. On the other hand, received in the other slot 67 is a fingering rod 69 which is connected to the micromotion rotational ring 64. The fingering rod 69 is held in abutting engagement, at one side of its outer end portion, with an adjuster screw 70 (or a micrometer head) for fine adjustments in the angular direction θ, by means of a spring 71 which is located on the other side of the outer end portion of the fingering rod 69 to press same against the adjuster screw 70. Therefore, when the rotational shaft 65a and the micromotion rotational ring 64 are integrally held together by the locking screw 68, the turn table 65 can be turned together with the micromotion rotational ring 64 for fine adjustments of its angular position within the range delimited by the width of the slot 67.

Figure 8:
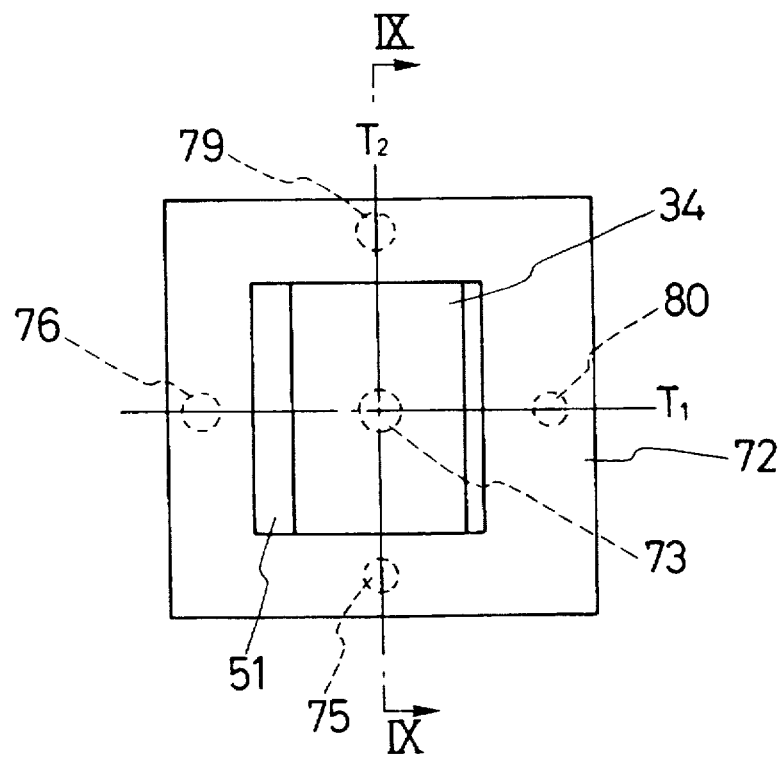
FIG. 8 is a plan view of a tilt angle adjustment stage.
Figure 9:
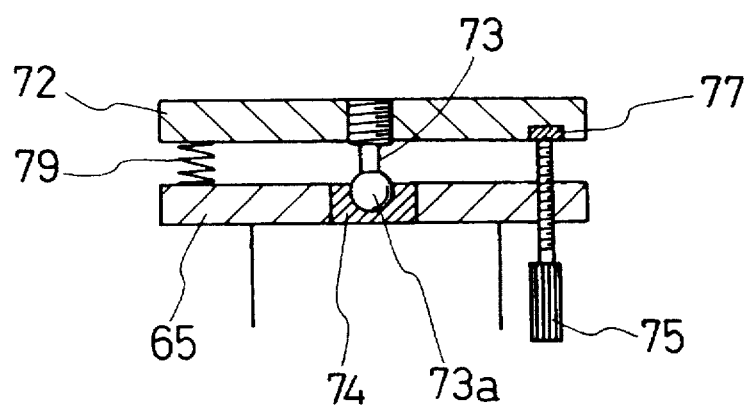
FIG. 9 is a sectional view taken on line IX—IX of FIG. 8.

As illustrated in FIGS. 8 and 9, a tilt angle adjustment stage is provided on the turn table 65 of θ-angle adjustment stage. The tilt adjustment stage includes a substantially rectangular tilt table 72 with a ball and socket joint 73 at the center thereof. The ball and socket joint 73 has its ball member 73 fitted in a spherical socket bearing 74 which is provided on the turn table 65. A pair of adjuster screws 75 and 76 are threaded through the turn table 65 from beneath at positions spaced from the ball and socket joint 73 by a predetermined distance in the direction of the generator B and in the direction perpendicular to the generator B, respectively. The fore ends of these adjuster screws 75 and 76 are abutted against screw holder members 77 and 78 (of which the holder member 78 is not seen in the drawing) on the lower side of the tilt table 72. Compression springs 79 and 80 are changed between the tilt table 72 and the turn table 65 at positions opposing the adjuster screws 75 and 76 across the ball and socket joint 73. Accordingly, the tilt table 72 is rockable up and down about a first tilt axis T1 by turning the adjuster screw 75. The first tilt axis T1 extends through the optical axis of the holographic optical element 12 in a direction perpendicular to the generator B of the specimen. On the other hand, by turning the other adjuster screw 76, the tilt table 72 is rockable about a second tilt axis T2 which perpendicularly intersects the tilt axis T1. The adjustment in the direction of the second tilt axis T2 is not necessarily required in every case, but it can be effected through the adjuster screw 76 if necessary for bringing the center of the specimen lens 14 accurately into alignment with the optical axis of the holographic optical element 12.

In this manner, when measuring the surface condition of the specimen lens 14 by the above-described multiple axis adjustment mechanism 50, the specimen lens 14 which is set on the specimen holder table 51 can be set in a correct position for measurements by adjustments in the directions of X- and Y-axes, in the horizontal angle θ and in tilting directions.

In order to measure the surface configuration of the cylindrical surface 14a, the specimen lens 14 is set on the specimen holder table 51 in such a way that its generator B lies in the direction of the straight grating lines of the holographic pattern on the face of the holographic optical element 12. In this regard, because of the angle of incidence of the laser light from the fourth reflector mirror 11, the holographic optical element 12 itself is set to have its grating lines in the transverse direction in FIG. 3, so that the specimen lens 14 is set to have its generator B likewise in that direction. Since obstacle-free open spaces are provided on the front and lateral sides of the specimen holder table 51 as mentioned hereinbefore, one can set the specimen lenses on and off the specimen table 51 quite easily. The provision of open spaces on the opposite lateral sides of the specimen holder table 51 has a great significance especially in case of measurement of lengthy lens elements or in case of setting and ejecting specimen lenses by automatic operations.

Prior to starting the measurement of the surface configuration of a specimen lens 14, a prototype optical element which has an ideal surface configuration for the specimen lens 14 is firstly set on the specimen holder table 51. Then, the locking screw 54 is loosened to unlock the coarse-adjustment slider 53a of the lift table 53, permitting to move the lift table 53 coarsely in an upward or downward direction. As soon as a target position is approximately reached, the locking screw 54 is tightened to fix the coarse-adjustment slider 53a of the lift table 53. In this state, the fine-adjustment slider 53b is shifted by upward or downward micromotions upon turning the screw 55 for strictly determining the prototype lens position in the direction of Z-axis.

The specimen holder table 51 is linked to the movement of the support arm 56 on the fine-adjustment slider 53b of the lift table 53, so that, after a rough adjustment in the direction of Z-axis through the roughing slider 53a, the prototype lens position in the direction of Z-axis can be strictly determined by slightly shifting the fine-adjustment slider 53b upward or downward, bringing the center O of the curved surface configuration R of the cylindrical prototype lens exactly to a position at the converging point of the diffraction light from the holographic optical element 12. In case the radius of curvature of the curved surface configuration R is known beforehand, the adjustment of the position in the direction of Z-axis can be made more easily by the use of a scale, which indicates the height of the lift table, in combination with the adjuster screw 55 which is graduated in the fashion of micrometer head.

Even if the center O of the curved surface configuration R is located at the light converging point of the holographic optical element 12 in the direction of Z-axis, there may still be a positional deviation in a horizontal direction. In this connection, at any point in the longitudinal direction of the prototype lens, the center O of the curved surface R should be located on one and same straight line which extends in the direction of the generator B of the cylindrical surface. Namely, there arises a necessity for adjusting the prototype position within a horizontal plane in a direction perpendicular to the generator B, that is, in the direction of X-axis. For adjustment of the X-axis position, the X-axis table 61 is shifted along the guide rail 60 by turning the adjuster screw 62. Regarding the adjustment in the direction of Y-axis, it is not always required, but the center of the inspecting surface can be brought into alignment with the center axis of the holographic optical element 12 by shifting the position of the Y-axis table 58 whenever necessity arises.

Further, in order to establish parallelism between the generator B of the prototype lens and the grating pattern G of the holographic optical element 12, the adjuster screw 70 is turned to shift the position in the angular direction θ through rotation of the turn table 65. In this regard, the turn table 65 can be put in a roughing-down motion for coarse adjustment or in a micromotion for fine adjustment. The axes of the specimen holder table 51 and the holographic optical element 12 are approximately aligned with each other by a roughing-down motion in an initial stage of the horizontal angular adjustment. In this state, the adjuster screw 70 is located substantially at the center of the slot 67, so that the adjustment in the angular direction O can be completed easily by micromotions of the turn table 65 through a relatively small angle.

Thereafter, inclination of the generator B of the prototype lens is corrected by a tilt adjustment. In this tilt adjustment, the tilt table 72 is rocked about the tilt axis T1 by turning the adjuster screw 75 until the generator B is positioned perpendicularly to the center axis of the holographic optical element 12.

As a consequence of the foregoing multiple axis or multiple stage adjustments, the specimen holder table 51 is located in a correct measuring position for the specimen lens 14 to be set on the specimen holder table 51. Now, the specimen lens 14 is set on the specimen holder table 51 in place of the prototype lens, irradiating the cylindrical surface 14a of the specimen lens 14 with the diffraction light from the holographic optical element 12 through the aperture 42, while reflecting the regular reflection light from the holographic optical element 12 on the reference reflector plate 13. As a result, interference fringes are produced by the interference between the object wave light reflected from the specimen lens 14 according to the holographic pattern and the reference wave light reflected from the reference reflector plate 13, which are superposed one on the other. The image of the interference fringes is taken by the image pickup means 22, thereby permitting to measure the surface condition of the cylindrical surface 14a with an extremely high degree of accuracy.

Although there is no particular restrictions on the above-described multiple axis adjustment procedure, it is preferable to make adjustments in the order of the Z-axis stage, X-axis stage, θ-angle stage, and tilt angle stage.

Aside from the multiple axis adjustment using a prototype lens, the adjustment of the Z-axis is extremely easy especially in case of measuring a cylindrical surface with a known radius of curvature, while it is relatively difficult to make adjustments of the X-axis and θ-angle stages smoothly at least unless the center O of the curved surface R of the specimen lens 14 is located in the same horizontal plane as the light converging point of the holographic optical element 12. The adjustment of the X-axis stage may be preceded by the adjustments of the θ-angle stage or vice versa. In this regard, it is preferable to adjust the lens position in the direction of the generator B while holding the center O of the curved surface R in an adjusted position on the optical axis A of the holographic optical element 12. The tilt angle adjustment Comes last because an earlier tilt angle adjustment would make the adjustments of other directions or other positions difficult by increasing the extent of displacement of the center O of the curved surface R. Any way, the specimen lens 14 is positioned while observing the number and shape of interference fringes by way of the picture image of interference fringes which is taken by the image pickup means 22 and displayed on a monitor.

On the other hand, in case the radius of curvature of the curved surface R of the specimen lens 14 is not known, firstly the lift table 53 is moved upward to locate the specimen lens 14 at the cat's eye point position, which is indicated by imaginary line in FIG. 1, and then moved downward to the measuring position indicated by solid line. The light spot diameter becomes smallest at the cat's eye point, and the radius of curvature of the specimen lens can be known from the distance between the cat's eye point and the measuring position.

Figure 10:
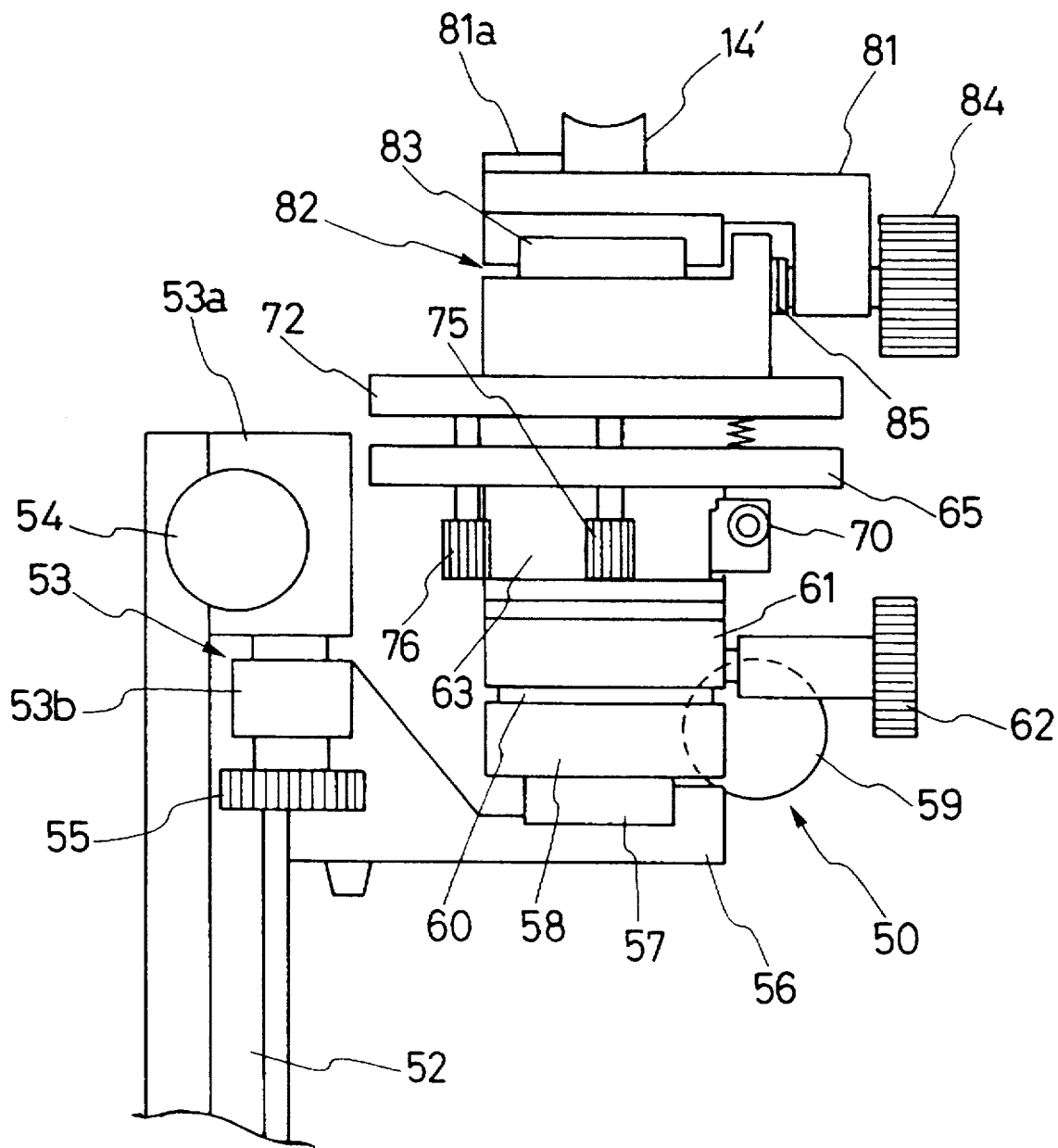
FIG. 10 is a left-hand side view of a specimen positioning mechanism suitable for use in the measurement of lengthy cylindrical optical elements.
Figure 11:
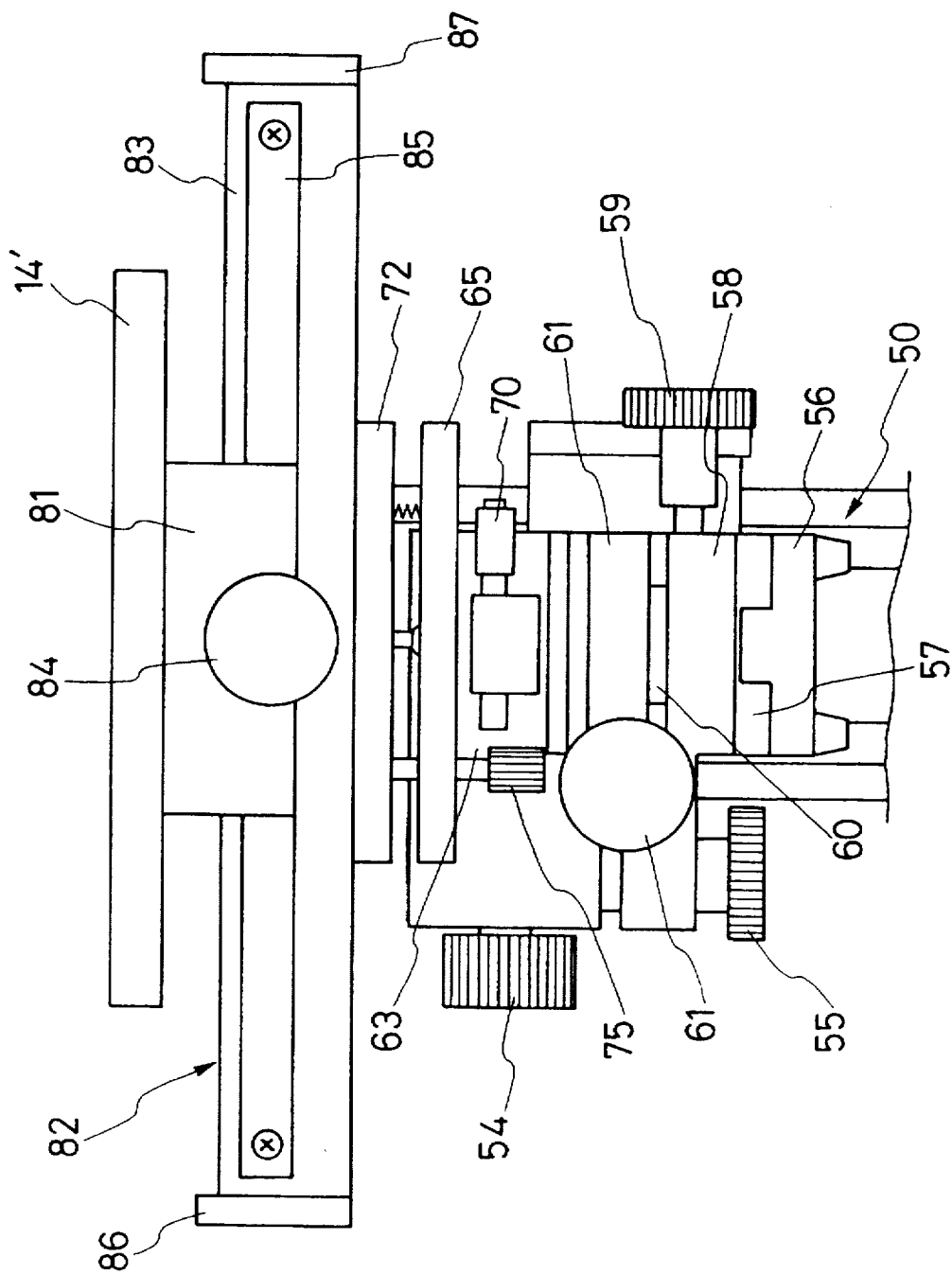
FIG. 11 is a front view of the mechanism of FIG. 10.

The cylindrical optical elements which are used on scanning optical systems of copier machines and facsimile machines are usually of elongated forms. In the measurement of a cylindrical surface of a lengthy optical element, there might arise a problem that the diffraction light from the holographic optical element is shed only on part of the elongated cylindrical surface. FIGS. 10 and 11 illustrate a modified arrangement especially suitable for cylindrical optical elements of elongated form, in which the component parts having identical or equivalent counterparts in FIGS. 1 to 9 are designated by similar reference numerals and their description is omitted to avoid repetitions.

Indicated at 14' is a specimen lens, more specifically, a lengthy cylindrical optical element set on a specimen holder table 81 which is mounted on a linearly reciprocating means 82 for adjustment in the direction of Y-axis, namely, in the direction of the generator B of the cylindrical surface to be measured. The specimen holder table 81 is provided with a projection 81a which determines the setting position of the specimen lens 14'. The reciprocating means 82 includes a slide guide 83 which is provided on a tilt table 72 in the direction of Y-axis for guiding the specimen holder table 81 therealong. For the purpose of fixing the specimen holder table 81 stably in a desired position in the direction of Y-axis, a locking screw 84 which is threaded through the specimen holder table 81 is pressed against a friction strip 85 on a lateral side of the slide guide 83. The reference numerals 86 and 87 indicate stoppers which serve to prevent derailing or dislocation of the specimen holder table 81 from the slide guide 83.

With the above arrangements, the multiple axis adjustments in position and direction are carried out for the specimen holder table 81 at a certain position in the same manner as in the above-described first embodiment, in the order of the Z-axis adjustment, X-axis adjustment, θ-angle adjustment and tilt angle adjustment. Thereafter, the measurement of the cylindrical surface is conducted while feeding the specimen holder table 81 intermittently in a predetermined pitch or by a distance corresponding to the field of measurement until the lengthy Cylindrical optical element is entirely inspected from one to the other end thereof.

In the measurement of the specimen lens 14 (or 14'), the flux of laser light which is projected upwardly from the laser light source 2 within the light projection/observation unit 31 is reflected on the reflector mirror 3 to turn the light path into a horizontal direction and then reflected again on the beam splitter 6 to turn the light path into a downward direction. The flux of parallel laser light from the collimator lens 7 is led into the housing 40 through the aperture 41 of the interferometer unit 32.

In order to facilitate the setting and ejecting operations, the specimen lens 14 is simply placed on top of the specimen table 51 with its cylindrical surface 14a faced upward. Accordingly, the holographic optical element 12 is faced downward in confronting relation with the specimen lens 14 and arranged to direct the diffraction light substantially in a vertically downward direction. Therefore, it is necessary to make arrangements to the effect that the incident light on the holographic optical element be cast thereto obliquely from beneath.

For this purpose, the light path from the light projection/observation unit 31 needs to be turned around free of any obstruction and led into the interferometer unit 32 of compact construction. The flux of laser light which has been led downward into the housing 40 of the interferometer unit 32 is reflected on the first and second reflector mirrors 8 and 9 to turn the light path upward. The direction of the laser light flux is further switched by reflections on the third and fourth reflector mirrors 10 and 11. In this instance, the housing 40 of the interferometer unit 32 can be arranged in a compact form by locating the aperture 42 at a position in the vicinity of the cat's eye point of the diffraction light from the holographic optical element 12 and at a level slightly lower than the position of the fourth reflector mirror 11.

Since the interferometer unit 32 is provided within the housing 40, almost the entire light path from the laser light source 2 to the reference reflector plate 13 and specimen lens 14 via the holographic optical element 12 is routed through closed spaces except the gap space of a minimum necessary width between the light projection/observation unit 31 and the housing 40 of the interferometer unit 32 and between the housing 40 and the specimen lens 14. Namely, the light path portion which is exposed to the outside is limited to a minimum necessary length, thereby preventing intrusion of harmful light and precluding the problem of fluctuations of the light path to ensure extremely stabilized measurement of the surface configuration of the specimen lens 14.

Figure 12:
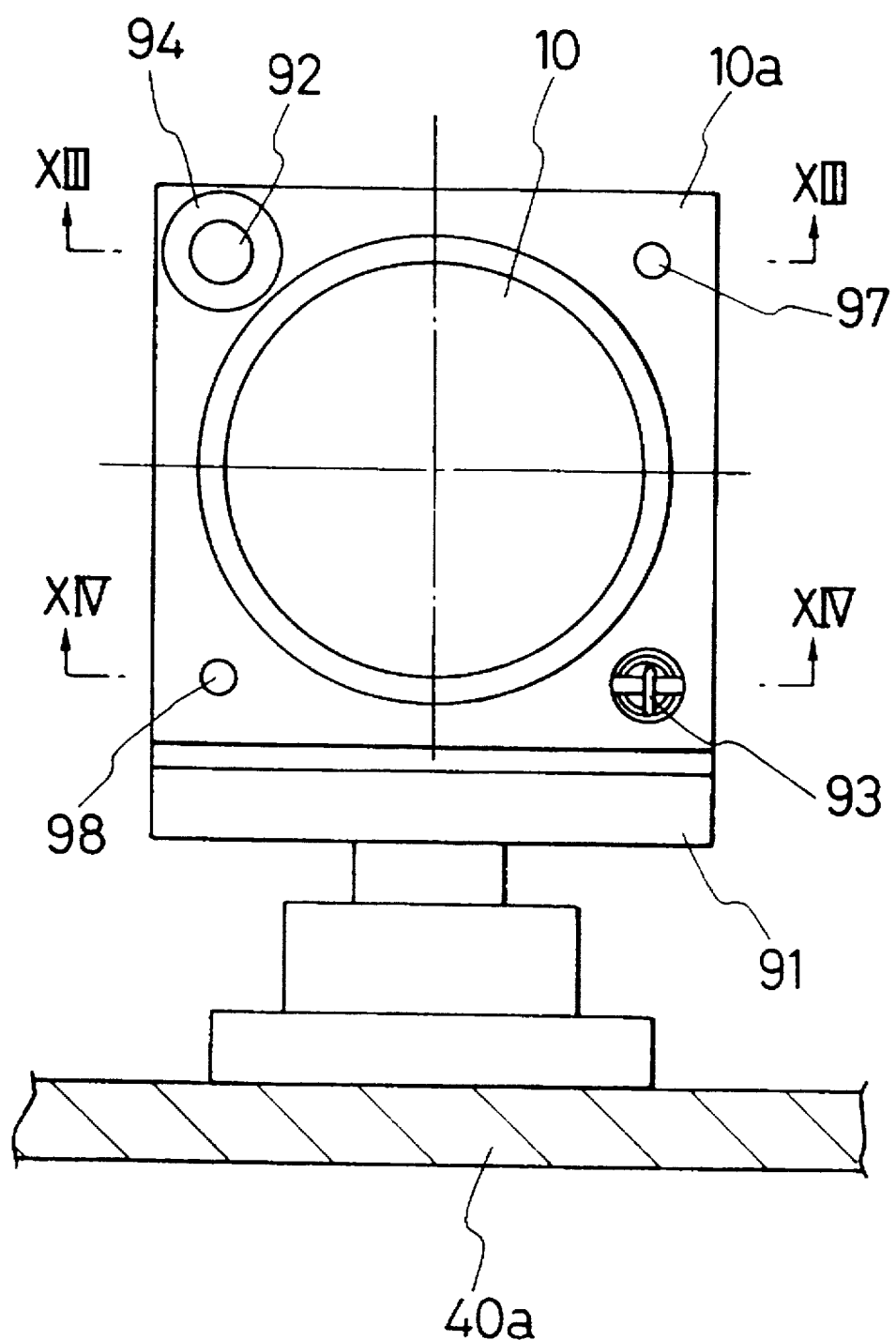
FIG. 12 is a plan view of a third reflector mirror support mechanism.
Figure 13:
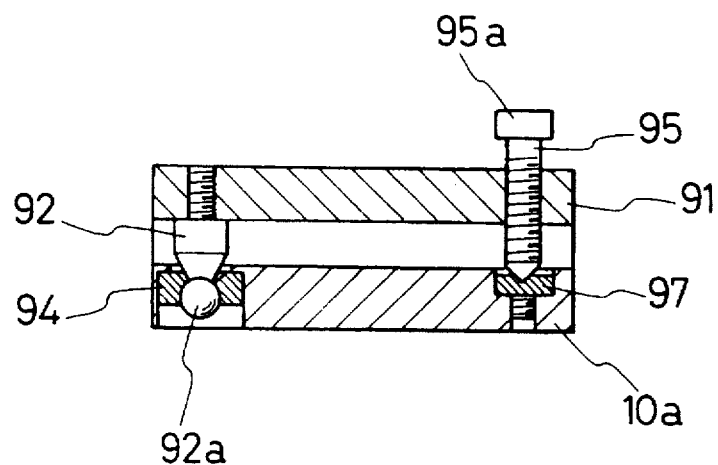
FIG. 13 is a sectional view taken on line XIII—XIII of FIG. 12.
Figure 14:
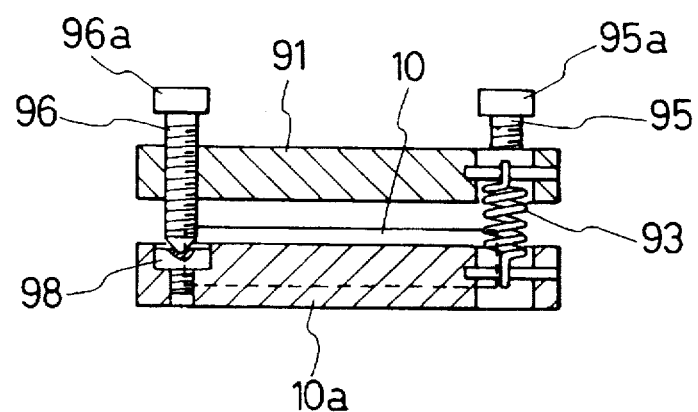
FIG. 14 is a sectional view taken on line XIV—XIV of FIG. 13.
Figure 15:
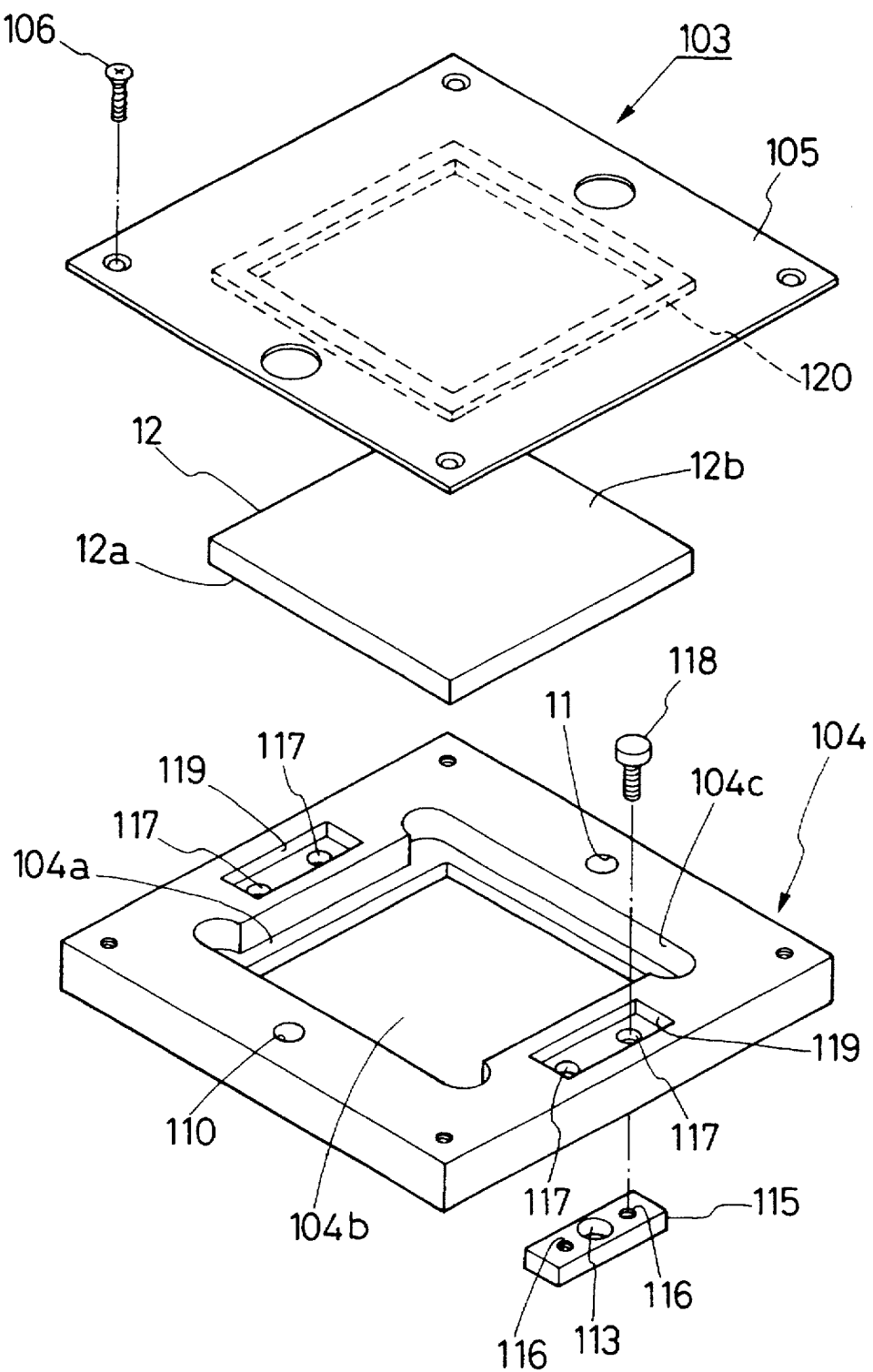
FIG. 15 is an exploded perspective view of a hologram cassette.
Figure 16:
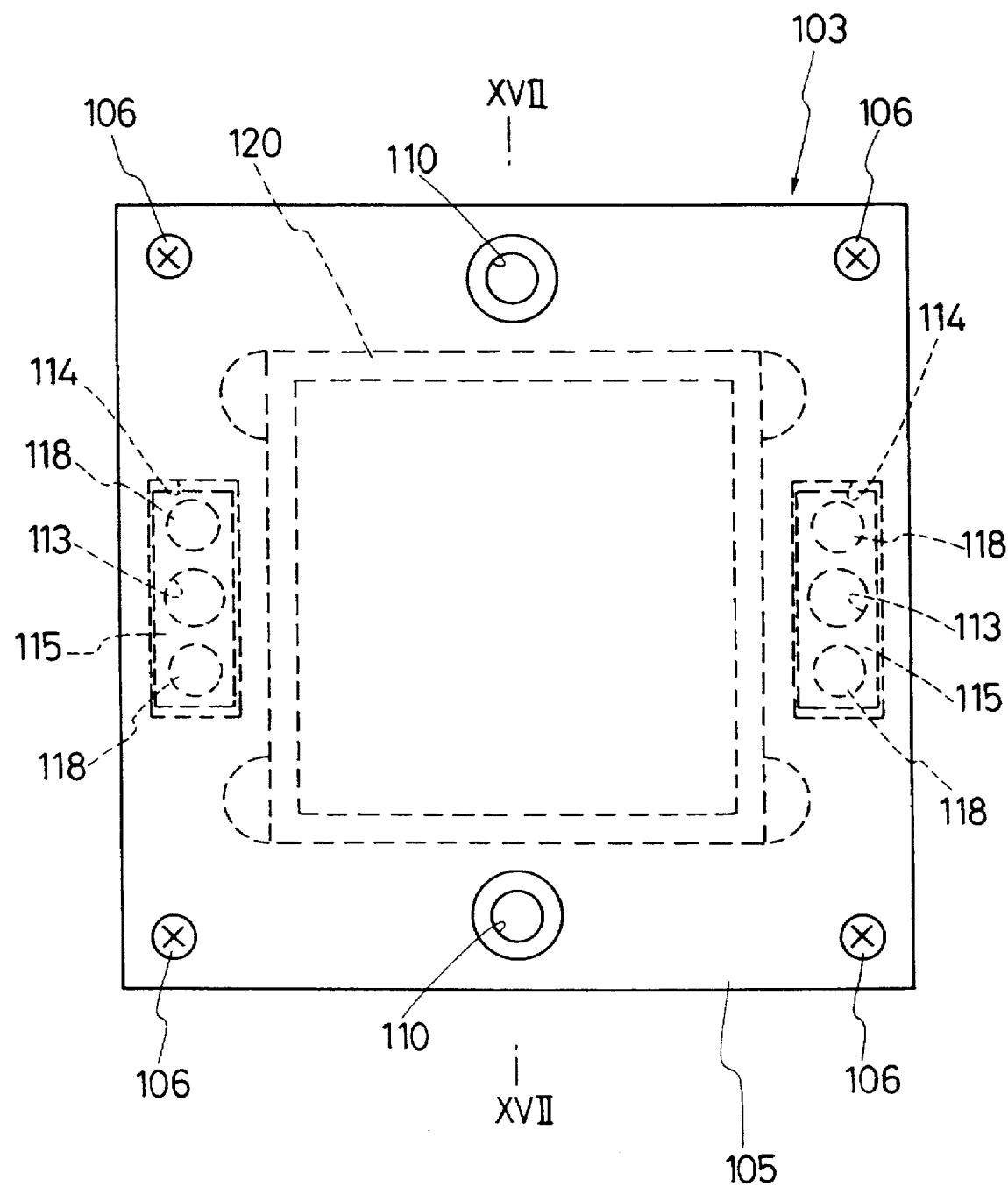
FIG. 16 is a plan view of the hologram cassette in assembled state.
Figure 17:
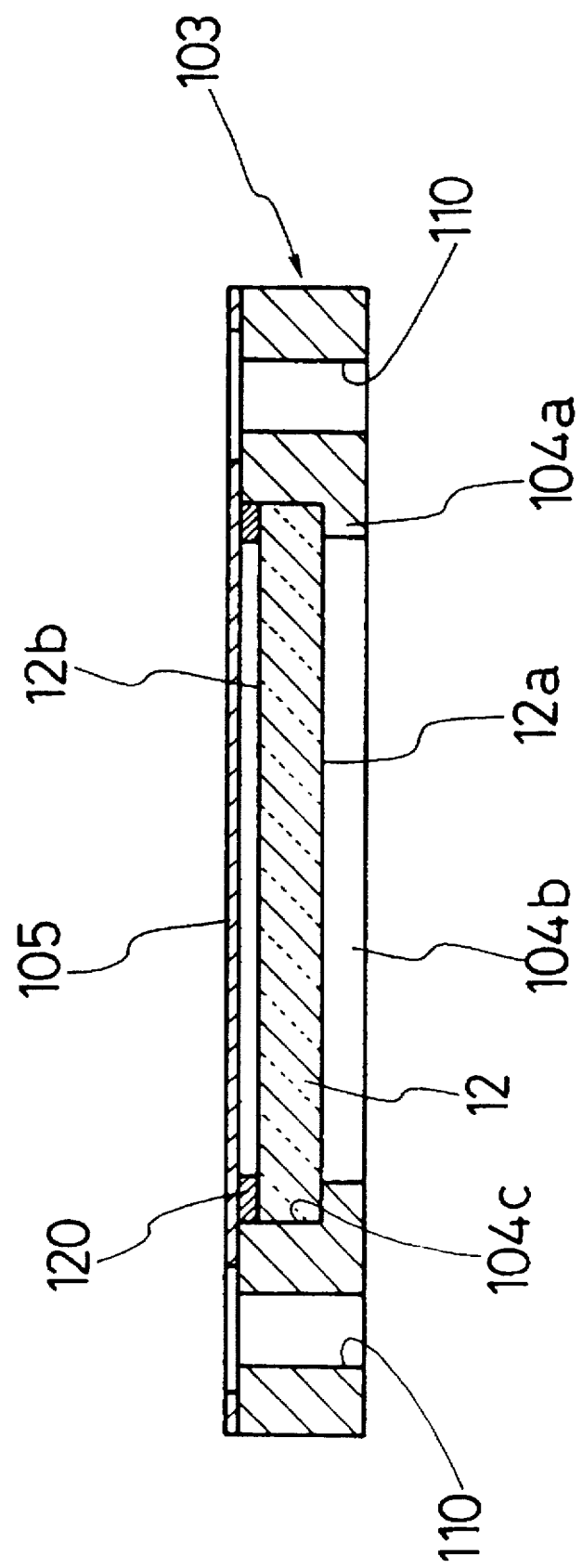
FIG. 17 is a sectional view taken on line XVII—XVII of FIG. 16.

Since the light projection/observation unit 31 and the interferometer unit 32 are separately fixed on the machine bed 30, difficulties might be encountered in establishing exact alignment of the optical axes of the light projection/observation unit 31 and the interferometer unit 32. Therefore, the third reflector mirror 10 is provided with a fine angular adjustment mechanism of the arrangement as shown in FIGS. 12 to 14. Namely, the third reflector mirror 10 is mounted on a mirror holder of substantially square shape which is supported on a support plate 91 in face to face relation with the latter. The support plate 91 is fixed on a side wall 40a of the interferometer unit housing 40, and provided with a ball and socket joint 92 and a tension spring 93 in two diagonally opposite corner portions of its four corner portions. The ball member 92a of the ball and socket joint 92 is fitted in a spherical bearing 94 which is provided in the mirror holder 10a, while the other end of the tension spring 93 is connected to the mirror holder 10a. Therefore, the mirror holder 10a is supported on the support plate 91 tiltably in an arbitrary direction. Adjuster screws 95 and 96 are threaded into the other two corner portions of the support plate 91, respectively, with the tip ends of the respective adjuster screws 95 and 96 being abutted against catch members 97 and 98 on the mirror holder 10a. Accordingly, upon turning these adjuster springs 95 and 96, the third reflector mirror 10 can be tilted in a desired direction along with the mirror holder 10a.

In this instance, the reflecting surface of the third reflector mirror 10 is faced substantially in a downward direction, and screw heads 95a and 96a of the adjuster screws 95 and 96 are located on the upper side of the support plate 91, so that each of the screw heads 95a and 96a is accessible by a screwdriver or other suitable jig through one of jig insertion holes 99a and 99b (FIG. 4) which are formed in a top wall portion of the circumventive wall 40b around the upper extension room 40S of the housing 40. These jig insertion holes 99a and 99b are normally closed with plug members. Therefore, after removing the plug members, one can turn the adjuster screws 95 and 96 in a desired direction to adjust the angular position of the third reflector mirror 10 on the part of the interferometer unit 32 into alignment with the optical axis of the light projection/observation unit 31. In place of this arrangement, a similar angular adjustment mechanism may be provided in association with the first reflector mirror 8 or the second reflector mirror 9 of the light projection/observation unit 31 inorder to align the optical axes of the light projection/observation unit 31 and the interferometer unit 32 with each other.

Further, the light projection/observation unit 31 and the interferometer unit 32 are constructed independently of each other, so that the maintenance and service can be performed separately and independently for each unit, including repair, inspection and replacement of certain component parts of each unit. For example, the adjustments of relative positions of associated parts after repair or replacement of a certain component part in the light projection/observation unit can be completed mostly on the side of the light projection/observation unit alone, regardless of the component parts of the interferometer unit 32 except the third reflector mirror 10. On the other hand, the adjustments after repair or replacement of a component 2 part of the interferometer unit 32 can be completed regardless of the light projection/observation unit 31. This contributes to enhance the efficiency of the maintenance and service to a considerable degree.

Naturally, the holographic optical element 12 needs to be replaced to change the holographic grating pattern depending upon the shape of the specimen lens to be inspected. In this regard, FIGS. 15 through 22 illustrate a hologram holder 100 for detachably mounting the holographic optical element 12 in position on the interferometer unit 32 through an opening 101 which is formed in the wall of the upper extension room 40S of the interferometer unit housing 40. The opening 101 is normally closed with a lid member for the housing 102 (FIG. 4) which is placed into the housing and is removable at the time of replacement of the holographic optical element 12.

The holographic optical element 12 is formed with holographic grating of a predetermined pattern on its front side 12a and an anti-reflecting light-absorptive coating layer 12b on its back side. In addition, anti-reflecting and light-diffusing properties are imparted to the inner surface of a lid member of the hologram frame 105 to be fixed in face to face relation with the rear side of the holographic optical element 12. The holographic optical element 12 has a sufficient thickness for preventing its deformations or distortions which might otherwise be caused under the influence of heat or externally applied forces. The holographic optical element 12 is fixedly mounted on a frame-like body 104 of a hologram cassette 103 by the use of an adhesive, with the holographic pattern 12a on its front side faced toward an indented nest portion 104a of the frame body 104. The hologram cassette 103 is assembled by abuttingly placing the lid member 105 (FIG. 15) on the frame body 104, with the holographic optical element 12 set in position, and by tightly threading screws 106 at four corner portions of the lid member 105 into the frame body 104.

The hologram cassette 103 which has been assembled in this manner can be detachably set on the hologram holder 100 which is constituted by, for example, a support member 107 (FIG. 18) fixed on the side wall of the interferometer unit housing 40 and a holder frame 108 which is securely connected to the support member 107. The hologram cassette 103 is placed on top of the holder frame 108 and fixed to the latter by means of a pair of bolts 109 in front and rear end portions.

In order to set the holographic optical element 12 precisely in position on the cassette frame 104, the surface of the indented nest portion 104a, to be brought into direct abutting engagement with the holographic pattern surface 12a, is machined precisely to a flatness suitable for serving as a reference surface. Therefore, the holographic optical element 12 can be fixed in level state free of inclinations. On the other hand, the holographic optical element 12 is engaged by inner peripheral walls 104c around the opening 104b of the frame body 104, which determine the position of the optical element 12 in the horizontal direction.

Figure 18:
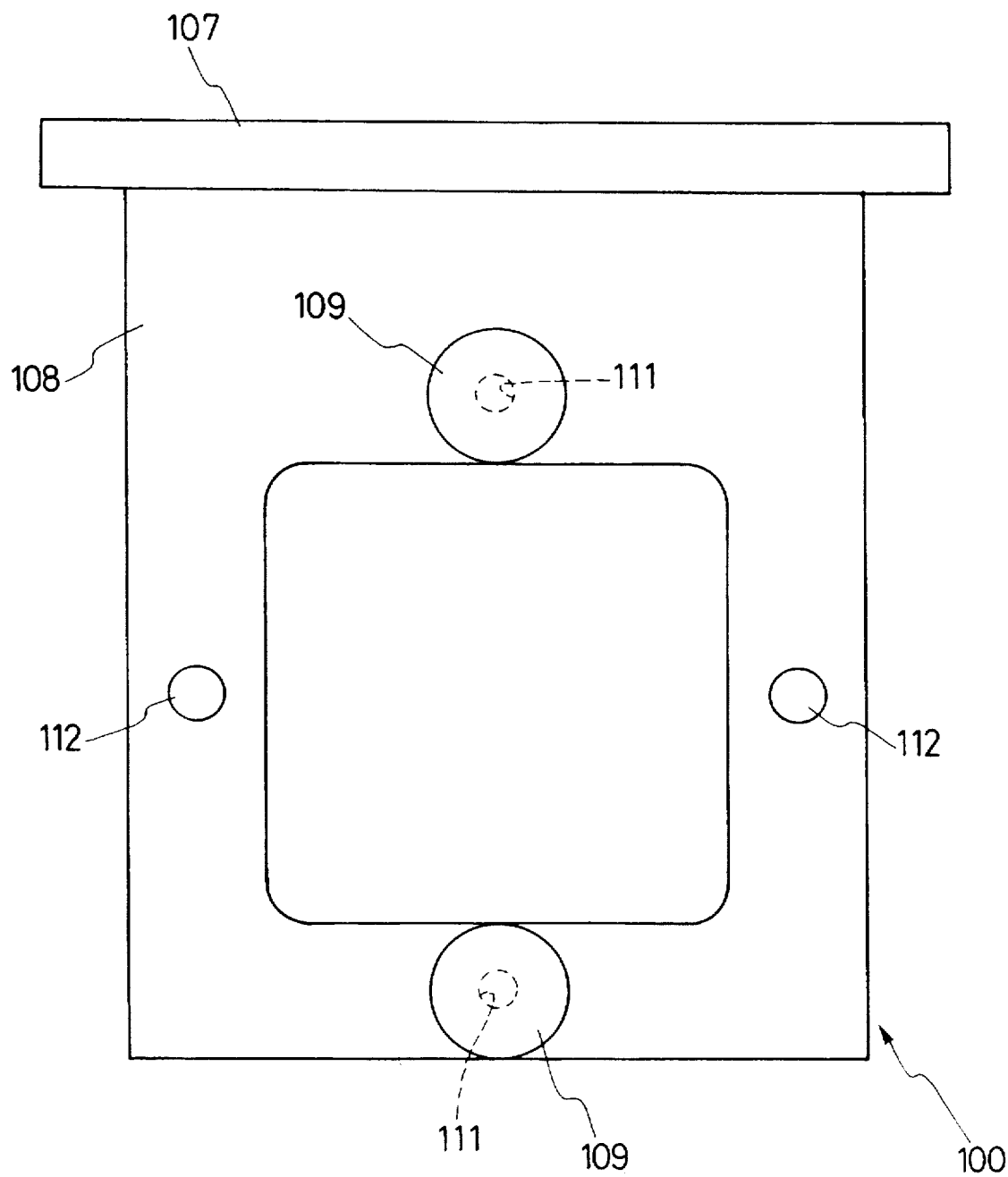
FIG. 18 is a plan view of a hologram holder.
Figure 19:
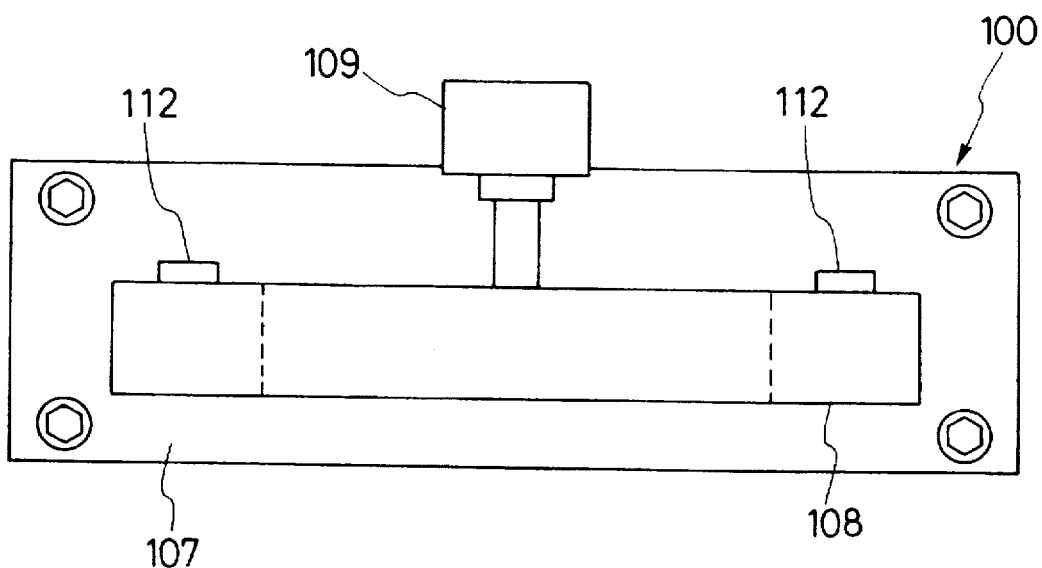
FIG. 19 is a front view of the hologram holder of FIG. 18.
Figure 20:
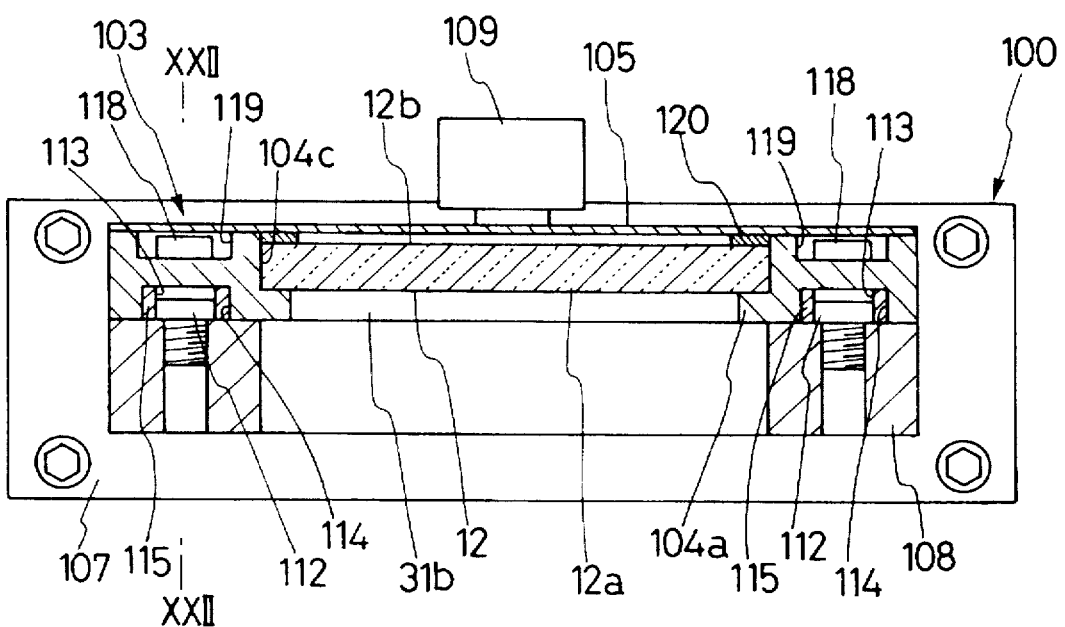
FIG. 20 is a sectional view of the hologram cassette and hologram holder in assembled state.

As illustrated in FIGS. 18 through 20, the hologram cassette 103 is placed on the holder frame 108 of the hologram holder 100, and securely fixed to the latter by threading the bolts 109 on the hologram cassette 103 into tapped holes 111 which are formed in the holder frame 108. In this connection, for the purpose of setting the hologram cassette 103 in position on the hologram holder 100, a pair of positioning pins are planted on the opposite side frame portions of the holder frame 108 for fitting engagement with pin receptacle holes 113 which are provided on the part of the hologram cassette 103.

As described hereinbefore, the holographic optical element 12 is assembled by abutting engagement with the indented nest portion 104a on the cassette body 104 and in a restrained state by engagement with the peripheral wall portions 104c. For assembling with the hologram cassette 103, the holographic optical element 12 is dropped onto the recessed portion 104a on the cassette body 104, so that it is possible to position the optical element strictly in a flat state in an extremely facilitated manner. However, in order to ensure smooth dropping, the outer dimensions of the holographic optical element 12 need to be slightly differentiated from the inside dimensions of the peripheral walls 104c which define the indented nest portion 104a. Therefore, the peripheral walls 104c simply have a function of roughly determining the position of the holographic element 12, leaving the possibilities of slight positional deviations of the holographic element 12 within a horizontal plane. However, as mentioned hereinbefore, it is necessary to adjust the position of the holographic element 12 strictly relative to the specimen lens and the reference reflector plate. For this purpose, the hologram cassette 103 itself is provided with a mechanism for correcting the position of the holographic element 12 relative to the cassette 103.

Figure 21:
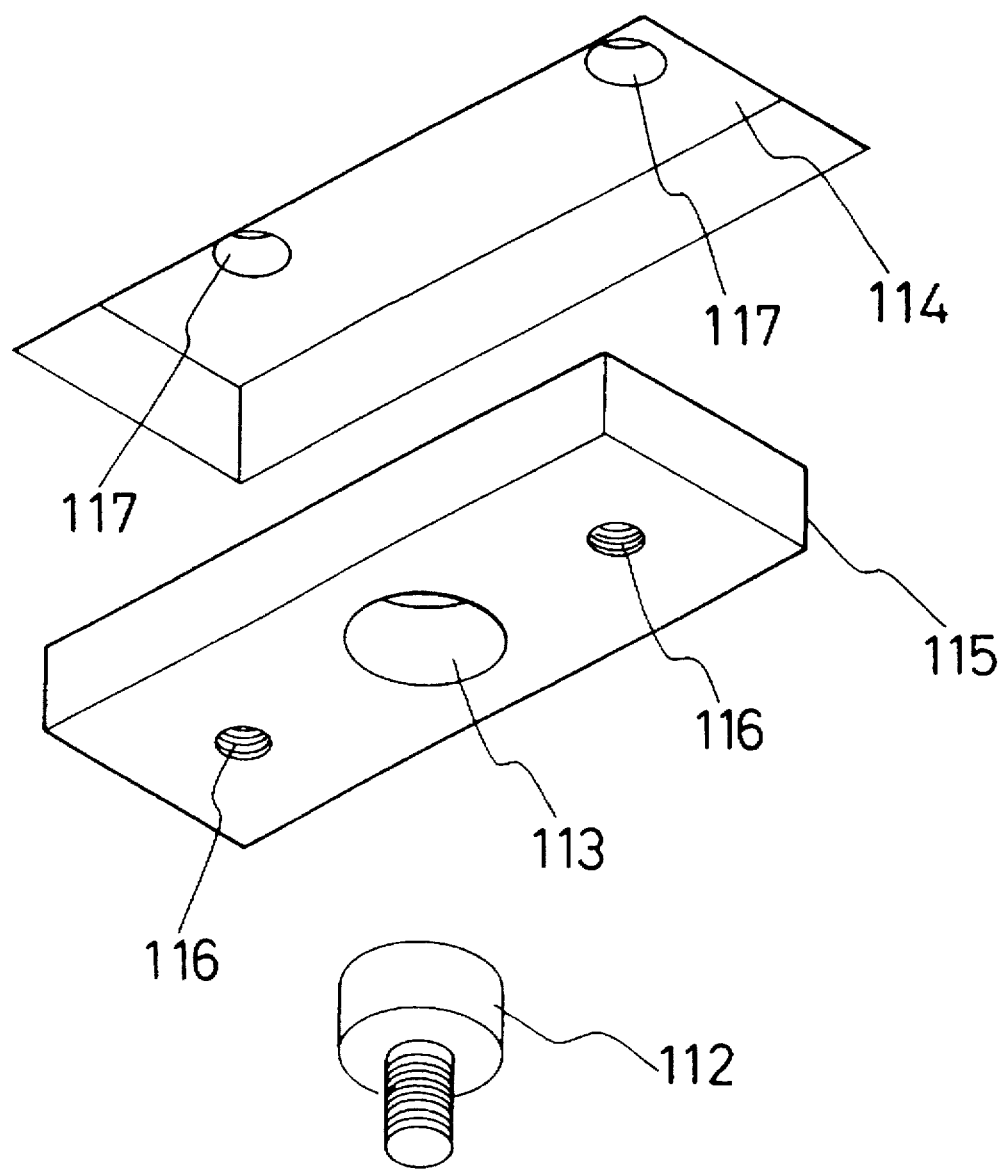
FIG. 21 is a schematic view explanatory of the arrangements of a positional deviation correcting mechanism for the holographic optical element on the holder.
Figure 22:
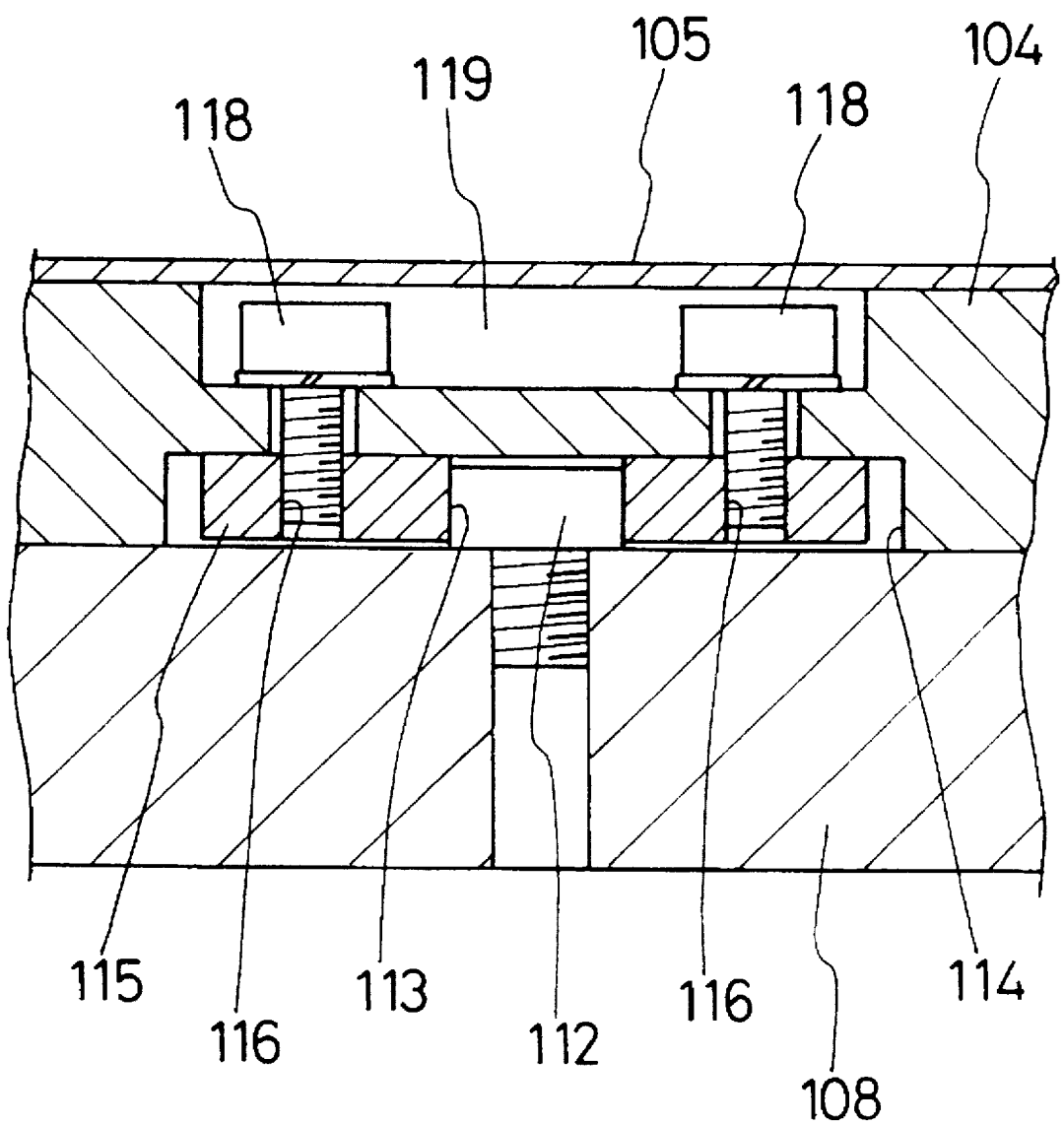
FIG. 22 is a sectional view taken on line XXII—XXII of FIG. 21.

As shown in FIGS. 21 and 22, the position correcting mechanism includes adjusting recesses 114 which are formed on the bottom side of the cassette body 104, and adjuster plates 115 fitted in the recesses 114. The above-described positioning pin insertion holes 113 on the part of the cassette are formed in these adjuster plates 115. Each adjuster plate 115 is provided with tapped holes 116 on the opposite sides of the pin insertion hole 113, in alignment with screw insertion holes 117 on the part of the cassette body 104. Screw receiving recesses 119 are formed at the upper ends of the screw insertion holes 117 to nest therein the heads of plate fixing screws 118 without permitting same to protrude above the upper surface of the cassette body 104. The plate fixing screw 118 are threaded into the tapped holes 116 in the adjuster plates 115 in the recesses 114 from the upper side of the cassette body 104 through the head nesting recesses 119 and screw insertion holes 117, thereby fixedly pressing the adjuster plates 115 against the inner surfaces of the recesses 114.

The screw insertion holes 117 have a diameter larger than the outside diameter of the plate fixing screws 118, while the adjuster plates 115 are smaller than the recesses 114 in width and length so that they can move within the recesses 114 to a predetermined degree in a sideward or longitudinal direction. However, the adjuster plates 115 have a thickness which is equivalent to or smaller than the depth of the recesses 114. Therefore, the positions of the pin insertion holes 113 which are in engagement with the positioning pins 112 on the holder frame 108 of the hologram holder 100 can be adjusted by moving the adjuster plates 115 in a desired direction. Besides, since the diameter of bores 110 is larger than the outside diameter of the bolts 9, the hologram cassette 103 itself can be shifted to and fixed in a slightly deviated position relative to the hologram holder 100 if necessary for adjustment purposes.

In the drawings, the reference 120 indicates square pad members of fibrous or non-fibrous flexible material with cushioning and light-absorbing effects, which are provided on the inner surface of the lid member 105 thereby to hold the holographic element 12 into pressed intimate contact with the nest 104a free of distortions.

What is claimed is:

1. An apparatus for holographic interferometry suitable for inspection of cylindrical optic surfaces, said apparatus comprising in combination:

a light projection/observation unit including a source section having a laser light source and a collimator lens to project laser light from said laser light source in the form of parallel light rays, and an interference fringe observation section;

an interferometer unit having a holographic optical element for splitting laser light rays from said light source section into regular reflection light and diffraction light, and a reference reflector plate located in position for reflecting said regular reflection light from said optical element; and a specimen holder unit located in a laterally open space beneath an overhanging portion of said interferometer unit, and having a specimen holder table adjustably supported on a multiple axis adjustment mechanism to hold a specimen of cylindrical optical element horizontally thereon with a cylindrical surface of said specimen in a correct position for reception of said diffraction light from said holographic optical element;

said light projection/observation unit being enclosed in a substantially closed housing except for an aperture opened at a position forward of said collimator lens and providing light passage to and from said interferometer unit;

said interferometer unit being enclosed in a substantially closed housing except for a first aperture opened in vertical alignment with said aperture in said light projection observation unit housing and providing a light passage to and from the latter, and a second aperture opened in said overhanging portion in vertical alignment with said specimen holder unit and providing a light passage to and from the latter; and said multiple axis adjustment mechanism including at least a Z-axis adjustment stage having a lift member for lifting said specimen holder table up and down in a vertical direction, and X-axis adjustment stage provided on said lift member of said Z-axis stage for shifting a position of said specimen in a direction perpendicular to a generator cylindrical surface within a horizontal plane, a θ-angle adjustment stage provided on said X-axis stage for adjusting the position of said specimen in an angular direction within a horizontal plane, and a tilt angle adjustment stage provided on said θ-angle stage for adjustably tilting said specimen holder table to either side thereof in a direction parallel with said generator of said cylindrical surface of said specimen.

2. An apparatus for holographic interferometry as defined in claim 1, wherein said X-axis adjustment stage includes a lift table slidably supported on a vertical support post through coarse- and fine-adjustment members, said X-axis adjustment stage includes an X-axis table linearly slidably mounted on said lift table for linear sliding movements in a direction perpendicular to the generator of said cylindrical surface, said θ-angle adjustment stage includes a turn table mounted on said X-axis table through coarse- and fine-adjustment members, and said tilt angle adjustment stage include an rockable member adjustably mounted on said turn table of said θ-angle stage.

3. An apparatus for holographic interferometry as defined in claim 1, wherein said multiple axis adjustment mechanism further comprises an elongated slide guide extending in a direction of said generator of said cylindrical surface of said specimen, for shifting a position of said specimen holder table in the direction of said generator of said cylindrical surface of said specimen.

4. An apparatus for holographic interferometry as defined in claim 1, wherein said slide guide is mounted on said rockable member of said tilt angle adjustment stage.

5. An apparatus for holographic interferometry as defined in claim 1, wherein said housing of said interferometer unit housing is constituted by a pair of side walls and a circumventive wall extending between and along peripheral edges of said side walls, and provided with an upper extension room overhanging said specimen positioning mechanism, said aperture being formed in a bottom portion of said upper extension room.

6. An apparatus for holographic interferometry as defined in claim 1, wherein said interferometer unit is provided with a plural number of reflector mirrors to turn a path of said laser light up and down within said housing, at least one of said reflector mirrors being provided with a tilt angle adjustment means to correct the light path between said laser light source and said holographic optical element.

7. An apparatus for holographic interferometry as defined in claim 6, wherein said holographic optical element is detachably mounted in position on said interferometer unit, and said housing of said interferometer unit is provided with a slot for removably inserting said holographic optical element into said position therethrough, said slot being normally closed with a lid member.

8. An apparatus for holographic interferometry as defined in claim 1, wherein said holographic optical element is mounted on a hologram cassette to be detachably mounted on a hologram holder fixed in a predetermined position on said interferometer unit housing, through a positioning means provided in at least two separate positions on said hologram holder for coupling engagement with positioning means on a part of said hologram cassette, and a fixation means for fixing said hologram cassette in an adjusted position on said hologram holder.

9. An apparatus for holographic interferometry as defined in claim 8, wherein said hologram cassette comprises a frame-like body having an indented nest portion for receiving therein said holographic optical element in abutting engagement with peripheral portions of a face of said holographic optical element bearing a holographic pattern, said indented nest portion having peripheral walls to hold said holographic optical element in a predetermined position on said hologram cassette.

10. An apparatus for holographic interferometry as defined in claim 9, wherein said positioning means on said hologram holder and said hologram cassette are constituted by pins, pin receptacle holes, and adjuster plates having pins or pin receptacle holes and adjustably and fixably fitted in said frame-like body of said hologram cassette.

11. An apparatus for holographic interferometry as defined in claim 10, wherein said holographic optical element is coated with an anti-reflecting light-absorbing layer on a rear side away from the face bearing said holographic pattern, and said hologram cassette is provided with a lid member having a light-absorbing and light-diffusing surface on the inner side thereof to be placed in face to face relation with said anti-reflecting light-absorbing layer on said holographic optical element when fitted on said frame-like body of said hologram cassette.

* * * * *

UNITED STATES PATENT AND TRADEMARK OFFICE
CERTIFICATE OF CORRECTION

PATENT NO. : 5,546,186
DATED : August 13, 1996
INVENTOR(S) : Shigenori OHI

It is certified that error appears in the above-indentified patent and that said Letters Patent is hereby corrected as shown below:

On the title page, Item [30], the Foreign Application Priority Data should read:

-- [30]  Jun. 8, 1993 [JP] Japan...........5-163351

Jun. 8, 1993 [JP] Japan...........5-163348

Jun. 8, 1993 [JP] Japan...........5-163349

Jun. 8, 1993 [JP] Japan...........5-163350

Signed and Sealed this

Tenth Day of December, 1996

*Attest:*

BRUCE LEHMAN

*Attesting Officer*     Commissioner of Patents and Trademarks